United States Patent
Kim et al.

(10) Patent No.: US 11,366,354 B2
(45) Date of Patent: Jun. 21, 2022

(54) DISPLAY DEVICE AND METHOD OF TIME DIVISION DRIVING DISPLAY DEVICE

(71) Applicant: Samsung Display Co., Ltd., Yongin-si (KR)

(72) Inventors: Dong-uk Kim, Hwaseong-si (KR); Minki Nam, Incheon (KR); Kyoungwon Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 9 days.

(21) Appl. No.: 16/387,475

(22) Filed: Apr. 17, 2019

(65) Prior Publication Data

US 2019/0331963 A1 Oct. 31, 2019

(30) Foreign Application Priority Data

Apr. 25, 2018 (KR) .................. 10-2018-0048071

(51) Int. Cl.
*G02F 1/13357* (2006.01)
*G02F 1/1335* (2006.01)
*G02F 1/135* (2006.01)

(52) U.S. Cl.
CPC .. *G02F 1/133602* (2013.01); *G02F 1/133514* (2013.01); *G02F 1/133617* (2013.01); *G02F 1/1351* (2021.01); *G02F 1/133613* (2021.01)

(58) Field of Classification Search
CPC ......... G02F 1/133602; G02F 1/133514; G02F 1/133617; G02F 2001/133613; G02F 2001/1351
See application file for complete search history.

(56) References Cited

U.S. PATENT DOCUMENTS

| | | | |
|---|---|---|---|
| 9,368,696 B1 * | 6/2016 | Murofushi | ............ H01L 33/504 |
| 9,454,936 B2 | 9/2016 | Kang et al. | |
| 9,659,545 B2 | 5/2017 | Cho et al. | |
| 9,736,900 B1 | 8/2017 | Stuppi | |
| 9,841,626 B2 | 12/2017 | Qiu | |

(Continued)

FOREIGN PATENT DOCUMENTS

| KR | 10-2006-0116479 | 11/2006 |
|---|---|---|
| KR | 10-0848420 | 7/2008 |

(Continued)

*Primary Examiner* — Patrick N Edouard
*Assistant Examiner* — Eboni N Giles
(74) *Attorney, Agent, or Firm* — H.C. Park & Associates, PLC

(57) ABSTRACT

A display device includes: a light source unit having: a first light source to emit first light having a first peak wavelength; and a second light source to emit second light having a second peak wavelength, the second peak wavelength being shorter than the first peak wavelength; a wavelength conversion member to absorb the second light and convert the second light into first color light and second color light, each of the first and second color light having peak wavelengths different from the first and second peak wavelengths; and a display panel having a first pixel area to display the first color light, a second pixel area to display the second color light, and a third pixel area to display the first light, wherein the first peak wavelength and the second peak wavelength have a value of about 365 nm or more to about 500 nm or less.

14 Claims, 16 Drawing Sheets

(56) References Cited

U.S. PATENT DOCUMENTS

| | | |
|---|---|---|
| 2006/0215388 A1 | 9/2006 | Hamada |
| 2006/0256253 A1 | 11/2006 | Park et al. |
| 2013/0241973 A1* | 9/2013 | Park .................... G09G 3/3413 |
| | | 345/691 |
| 2015/0227002 A1* | 8/2015 | Won .................. G02F 1/133603 |
| | | 349/68 |
| 2015/0228232 A1 | 8/2015 | Lee et al. |
| 2016/0351144 A1 | 12/2016 | Park et al. |
| 2017/0146857 A1 | 5/2017 | Wang et al. |
| 2018/0006093 A1 | 1/2018 | Kim et al. |
| 2019/0204645 A1* | 7/2019 | Chen ................. G02F 1/133528 |
| 2020/0144457 A1* | 5/2020 | Li ........................... H01L 33/50 |

FOREIGN PATENT DOCUMENTS

| | | |
|---|---|---|
| KR | 10-0855490 | 9/2008 |
| KR | 10-2010-0089606 | 8/2010 |
| KR | 10-2014-0111876 | 9/2014 |
| KR | 10-2018-0002933 | 1/2018 |

* cited by examiner

DISPLAY DEVICE AND METHOD OF TIME DIVISION DRIVING DISPLAY DEVICE

CROSS-REFERENCE TO RELATED APPLICATION

This application claims priority from and the benefit of Korean Patent Application No. 10-2018-0048071, filed on Apr. 25, 2018, which is hereby incorporated by reference for all purposes as if fully set forth herein.

BACKGROUND

Field

Exemplary implementations of the invention relate generally to display devices, and more specifically to display devices having improved optical efficiency.

Discussion of the Background

A liquid crystal display device includes a liquid crystal display panel which includes two opposed substrates and a liquid crystal layer disposed between the substrates. The liquid crystal display device generates an electric field in the liquid crystal layer by applying a voltage to an electric field generating electrode. Accordingly, an alignment direction of liquid crystal molecules of the liquid crystal layer is determined, and polarization of incident light is controlled to display an image. The liquid crystal display device may include a wavelength conversion member to express a color. The wavelength conversion member may include pigment particles including a predetermined color or a light-emitting material configured to emit a predetermined color. In a case in which the wavelength conversion member includes the light-emitting material, optical efficiency may be determined by a light absorption rate of the light-emitting material.

The above information disclosed in this Background section is only for understanding of the background of the inventive concepts, and, therefore, it may contain information that does not constitute prior art.

SUMMARY

Display devices constructed according to exemplary implementations of the invention have improved optical efficiency and color reproducibility.

For example, display devices and driving methods according to the exemplary implementations of the invention are capable of controlling at least two light sources that are time-division driven to improve color reproducibility and luminous efficiency of the display device.

More specifically, according to the principles and exemplary implementations of the invention, a display device has a light source unit to provide a first light and a second light having different peak wavelengths to a wavelength conversion member. The wavelength conversion member includes a light-emitting material that absorbs at least one of the first light and the second light and converts a wavelength of the absorbed light. One pixel area of a plurality of pixel areas of a display panel outputs the first light. A peak wavelength of the first light may be determined by considering color purity of the first light. The second light may have a shorter wavelength than the first light. Thus, light absorption rate and optical conversion efficiency of the light-emitting material with respect to the light provided from the light source unit may be improved. Accordingly, a display device having improved color reproducibility and luminous efficiency is achieved.

Additional features of the inventive concepts will be set forth in the description which follows, and in part will be apparent from the description, or may be learned by practice of the inventive concepts.

According to one or more embodiments of the invention, a display device includes: a light source unit having: a first light source to emit first light having a first peak wavelength; and a second light source to emit second light having a second peak wavelength, the second peak wavelength being shorter than the first peak wavelength; a wavelength conversion member to absorb the second light and convert the second light into first color light and second color light, each of the first color light and the second color light having peak wavelengths different from the first peak wavelength and the second peak wavelength; and a display panel having a first pixel area to display the first color light, a second pixel area to display the second color light, and a third pixel area to display the first light, wherein the first peak wavelength and the second peak wavelength have a value of about 365 nm or more to about 500 nm or less.

The first light and the second light may be blue light.

The first peak wavelength may be in a range of about 450 nm or more to about 500 nm or less, and the second peak wavelength may be in a range of about 365 nm or more to less than the first peak wavelength.

The wavelength conversion member may be configured to convert the first light and the second light into the first color light and the second color light, and the third pixel area may be configured to display the first light and the second light.

The display panel may be configured to display an image on a frame-by-frame basis, each frame may include a first sub-frame and a second sub-frame which are separate time divisions of the frame, and wherein the first light source may be configured to emit light during the first sub-frame, and the second light source may be configured to emit light during the second sub-frame.

The third pixel area may be configured to block display of the second light during the second sub-frame.

The first pixel area and the second pixel area may be configured to block display of the first color light and the second color light, respectively, during the first sub-frame.

The first color light and the second color light may have a longer wavelength than the first light, wherein the first color light may have a longer wavelength than the second color light, and wherein the second pixel area may be configured to block display of the second color light during the first sub-frame.

The first light source and the second light source may be configured to emit light during the second sub-frame, and the third pixel area may be configured to block display of the first and the second light during the second sub-frame.

The display panel may be configured to display an image on a frame-by-frame basis, each frame including a first sub-frame, a second sub-frame, and a third sub-frame which are separate time divisions of the frame, wherein the first light source may be configured to emit light during the first sub-frame, and the second light source may be configured to emit light during the second sub-frame and the third sub-frame, and wherein the first pixel area and the second pixel area may be configured to block display of the first color light and the second color light during the first sub-frame, the second pixel area and the third pixel area may be configured to block display of the second color light and the second light during the second sub-frame, and the first pixel area and the third pixel area may be configured to block display of the first color light and the second light during the third sub-frame.

The wavelength conversion member may include a first wavelength conversion portion and a second wavelength conversion portion, wherein the first wavelength conversion portion comprises a first light-emitting material and the second wavelength conversion portion comprises a second light-emitting material, wherein the first wavelength conversion portion may be configured to convert at least one of the first light and the second light into the first color light, the second wavelength conversion portion may be configured to convert at least one of the first light and the second light into the second color light, and wherein the first pixel area may overlap the first wavelength conversion portion, and the second pixel area may overlap the second wavelength conversion portion.

The wavelength conversion member may further include a light-transmitting portion that transmits the first light, and the third pixel area may overlap the light-transmitting portion.

The wavelength conversion member may be disposed under the display panel, and the wavelength conversion member may be configured to provide the first light, the second light, the first color light, and the second color light to the display panel.

According to one or more embodiments of the invention, a display device includes: a display panel having a first pixel area to display first color light, a second pixel area to display second color light, and a third pixel area to display blue light; and a light source unit having a first light source to provides first blue light having a first peak wavelength and a second light source to provide second blue light having a second peak wavelength different from the first peak wavelength, wherein the display panel is configured to display an image on a frame-by-frame basis, each frame including a first sub-frame and a second sub-frame which are separate time division of a frame, and wherein at least one of the first light source and the second light source are configured to emit light in each of the first sub-frame and the second sub-frame, and the third pixel area is configured to block display of the second blue light while the second light source emits light.

In an exemplary embodiment, the first pixel area may include a first wavelength conversion portion, the second pixel area may include a second wavelength conversion portion, and wherein the first wavelength conversion portion may be configured to convert at least one of the first blue light and the second blue light into the first color light, and the second wavelength conversion portion may be configured to convert at least one of the first blue light and the second blue light into the second color light.

The display device may further include a wavelength conversion member disposed under the display panel, wherein at least one of the first blue light and the second blue light may be incident on the wavelength conversion member, wherein the wavelength conversion member may be configured to convert a wavelength of the incident light to form the first color light and the second color light, and wherein the wavelength conversion member may be configured to provide the first color light, the second color light, and the light incident on the wavelength conversion member to the display panel.

The first peak wavelength may be longer than the second peak wavelength, and wherein the blue light to be displayed by the third pixel area may be the first blue light.

The first light source may be configured to emit light during the first sub-frame, and the second light source may be configured to emit light during the second sub-frame.

The first pixel area and the second pixel area may be configured to block display of the first color light and the second color light, respectively, during the first sub-frame.

The first color light and the second color light may have a longer wavelength than the first light, wherein the first color light may have a longer wavelength than the second color light, and wherein the second pixel area may be configured to block display of the second color light during the first sub-frame.

The first light source may be configured to emit light during the first sub-frame, and wherein the first light source and the second light source may be configured to emit light during the second sub-frame.

The first peak wavelength may be in a range of about 440 nm or more to about 500 nm or less, and the second peak wavelength may be in a range of about 365 nm or more to less than the first peak wavelength.

According to one or more embodiments of the invention, a method of time division driving a display device having a first light source, a second light source, and a wavelength conversion member configured to receive light from the first and the second light sources to generate a first color light and a second color light to display an image on a display panel on a frame-by-frame basis, with each frame having first and second sub-frames which are separate time divisions of the frame is provided, the method including: driving the first light source, during a first time period, to generate a first light in the first sub frame; transmitting the first light, during the first time period, to the outside of the display to display the first light on the display panel; driving the second light source, during a second time period after the first time period, to generate a second light in the second sub frame; transmitting the second light, during the second time period, to the wavelength conversion member to generate the first color light and the second color light on the display panel; and blocking the second light, during the second sub frame, from being transmitted to the outside of the display device.

The transmitting of the first light, during the first time period, to the outside of the display device may include transmitting the first light through the wavelength conversion member, and the blocking of the second light, during the second time period, to the outside of the display includes blocking the transmitting of the second light from being transmitted to the wavelength conversion member.

The method may further include: blocking the first light, during the first time period, from generating the first color light and the second color light in the wavelength conversion member.

The method may further include: transmitting the first light, during the first time period, to the wavelength conversion member to generate the first color light.

The method may further include: transmitting the first light, during the first time period, to the wavelength conversion member to generate the second color light.

The method may further include: blocking the first light, during the first time period from generating the second color light in the wavelength conversion member.

The display device may include a liquid crystal layer and blocking light includes aligning liquid crystals in the liquid crystal layer to prevent light from being transmitted therethrough.

Each frame further has a third sub frame, and the method further including: driving one of the first and second light source during a third time period to generate a third light in the third sub frame; transmitting the third light, during the third time period, to the outside of the display device to display the third light on the display panel; and blocking at least one of the first and second light, during the third sub frame, from being transmitted to the outside of the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
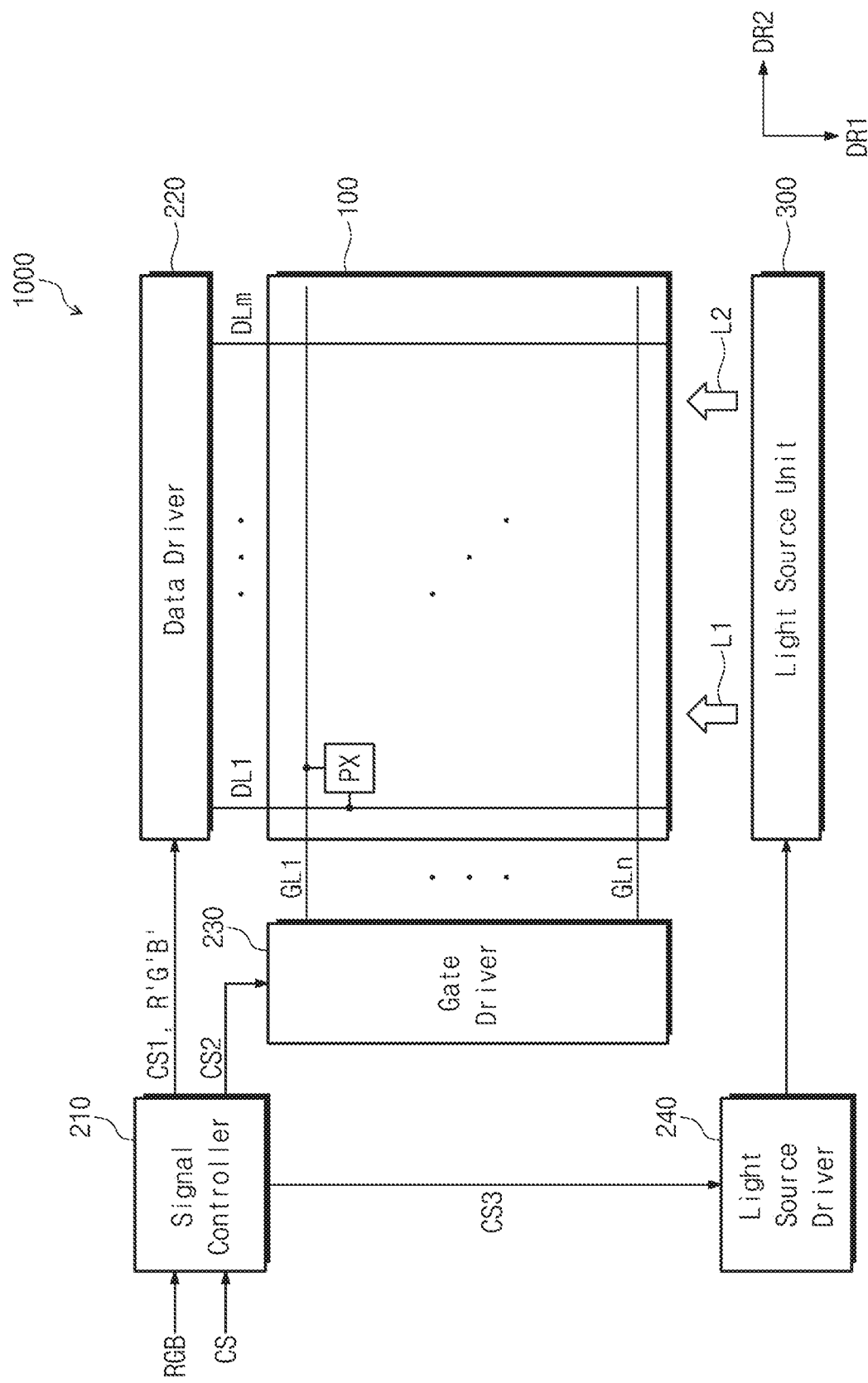
FIG. 1 is a schematic block diagram of a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be necessarily construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the invention will be described in detail with reference to the accompanying drawings.

FIG. 1 is a schematic block diagram of a display device according to an exemplary embodiment of the invention.

Referring to FIG. 1, a display device 1000 may include a display panel 100, a signal controller 210, a data driver 220, a gate driver 230, a light source driver 240, and a light source unit 300.

The display device 1000 may be used in a small and medium-sized electronic device, such as personal computers, notebook computers, personal digital assistants, car navigation units, game machines, portable electronic devices, tablets, and cameras, as well as a large-sized electronic device such as televisions, monitors, or outdoor advertising boards. Also, these are only provided as examples, the display device 1000 may also be used in other electronic apparatuses without departing from the inventive concepts.

The display panel 100 may be a non-emissive type display panel. For example, the display panel 100 may be a liquid crystal display panel. The display panel 100 may receive lights L1 and L2 from the light source unit 300 and may display an image by controlling transmission amounts of the lights L1 and L2.

The display panel 100 may include data lines DL1 to DLm, gate lines GL1 to GLn, and pixels PX. The data lines DL1 to DLm may extend along a first direction DR1 and may be arranged along a second direction DR2 crossing the first direction DR1. The gate lines GL1 to GLn may extend along the second direction DR2 and may be arranged along the first direction DR1. The data lines DL1 to DLm and the gate lines GL1 to GLn may define pixel areas, and the pixels PX configured to display an image may be included in the pixel areas.

The signal controller 210 may include a timing controller. The signal controller 210 receives image data RGB and control signal CS which are provided from the outside. The control signal CS may include a vertical synchronization signal, a horizontal synchronization signal, a main clock signal, and a data enable signal.

The signal controller 210 generates converted image data R'G'B' by converting the image data RGB to match operation of the display panel 100, and outputs the converted image data R'G'B' to the data driver 220.

The signal controller 210 provides a first control signal CS1 to the data driver 220, provides a second control signal CS2 to the gate driver 230, and provides a third control signal CS3 to the light source driver 240. The first control signal CS1 is a signal for controlling the data driver 220, the second control signal CS2 is a signal for controlling the gate driver 230, and the third control signal CS3 is a signal for controlling the light source driver 240.

The data driver 220 may provide a data signal to the data lines DL1 to DLm in response to the first control signal CS1. The data driver 220 may be realized as an independent integrated circuit chip so that it may be electrically connected to one side of the display panel 100 or may be integrated into a predetermined region of the display panel 100. In a case in which the data driver 220 is provided as an independent integrated circuit chip, the integrated circuit chip may be provided as a single chip or may be provided as a plurality of chips.

The gate driver 230 may provide a gate signal to the gate lines GL1 to GLn in response to the second control signal CS2. The gate driver 230 may be integrated into a predetermined region of the display panel 100. The gate driver 230 may be realized as a circuit which uses an amorphous silicon gate driver (ASG) using an amorphous silicon thin film transistor (a-Si TFT), an oxide silicon gate driver (OSG) using an oxide silicon thin film transistor, an oxide semiconductor, a crystalline semiconductor, or a polycrystalline semiconductor. Also, the gate driver 230 may be realized as an independent integrated circuit chip so that it may be electrically connected to one side of the display panel 100.

The light source driver 240 may control light emission of light sources included in the light source unit 300 in response to the third control signal CS3. For example, the light source driver 240 may be provided for time-division driving of the light source unit 300. Thus, in another exemplary embodiment of the invention, in a case in which the light source unit 300 does not require time-division driving, the light source driver 240 may be omitted. In this case, the signal controller 210 may not generate the third control signal CS3.

The light source unit 300 may provide the lights L1 and L2 to the display panel 100. In an exemplary embodiment of the invention, the lights L1 and L2 may include the first light L1 and the second light L2. The first light L1 and the second light L2 may have different peak wavelengths. For the purposes of this the description, a wavelength with the greatest light intensity is defined as the peak wavelength.

For example, in a case in which the light source unit 300 is driven in a time-division manner, the light source unit 300 may provide the first light L1 and/or the second light L2 to the display panel 100 in response to the signal provided from the light source driver 240. For example, the light source unit 300 may only provide the first light L1 to the display panel 100, may only provide the second light L2 to the display panel 100, or may provide the first light L1 and the second light L2 to the display panel 100.

Figure 2:
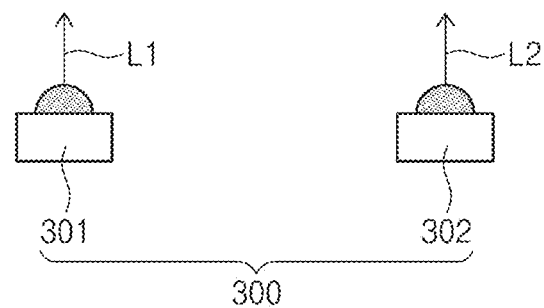
FIG. 2 illustrates a light source unit according to an exemplary embodiment of the invention.
Figure 3:
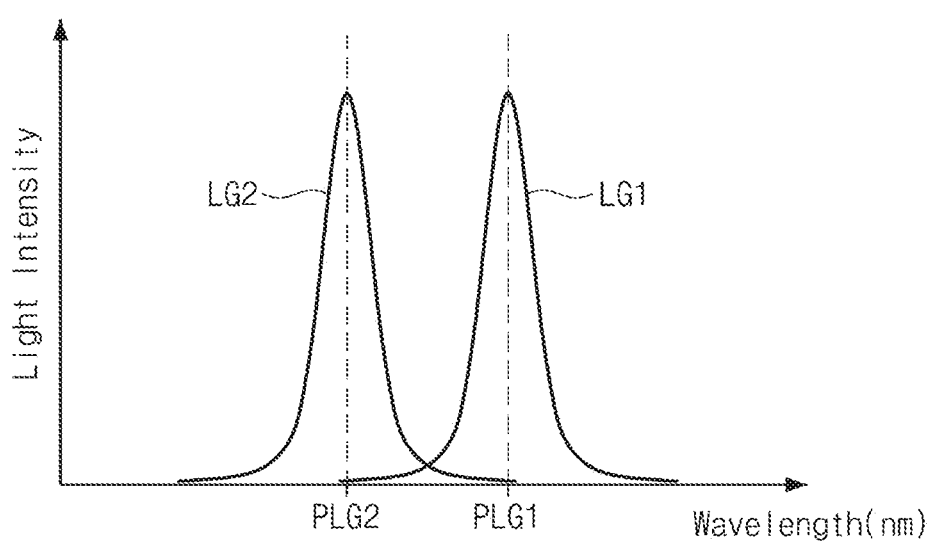
FIG. 3 is spectra of light emitted from a first light source and a second light source according to an exemplary embodiment of the invention.

FIG. 2 illustrates a light source unit according to an exemplary embodiment of the invention, and FIG. 3 is intensity spectra of light emitted from a first light source and a second light source according to an exemplary embodiment of the invention.

Referring to FIGS. 2 and 3, the light source unit 300 includes a first light source 301 and a second light source 302. The first light source 301 and the second light source 302 may be light emitting diodes (LEDs) or other light emission devices. The first light source 301 emits the first light L1 and the second light source 302 emits the second light L2.

In FIG. 3, a first spectrum LG1 illustrates a spectrum of intensity of the first light L1, and a second spectrum LG2 illustrates a spectrum of intensity of the second light L2. A first peak wavelength PLG1 of the first light L1 and a second peak wavelength PLG2 of the second light L2 may be different from each other. For example, the first peak wavelength PLG1 may be greater than the second peak wavelength PLG2.

In an exemplary embodiment of the invention, the first peak wavelength PLG1 and the second peak wavelength PLG2 may have a value of about 365 nm or more to about 500 nm or less. For example, the first peak wavelength PLG1 and the second peak wavelength PLG2 may be within a blue light wavelength range. Thus, the first light L1 may represent a first blue light, and the second light L2 may represent a second blue light.

The first peak wavelength PLG1 may be determined according to product specification (e.g., size, resolution, color coordinates, etc.) of the display panel 100 (see FIG. 1) in which the light source unit 300 is used. For example, the first peak wavelength PLG1 may have a value of about 450 nm or more to about 500 nm or less. As a specific example, in a case in which a product, in which the light source unit 300 is used, is required to satisfy BT 2020 (ITU-R Recommendation), the first peak wavelength PLG1 may have a value of about 450 nm or more to about 467 nm or less, and, for example, may be about 467 nm. Also, in a case in which the light source unit 300 is used in a small and medium-sized display panel 100 (see FIG. 1), the first peak wavelength PLG1 may have a value of about 465 nm or more to about 475 nm or less. However, this is only an example, and the value of the first peak wavelength PLG1 is not limited thereto.

The second peak wavelength PLG2 may have a value smaller than the first peak wavelength PLG1. For example, the second peak wavelength PLG2 may have a value of about 365 nm or more to less than the first peak wavelength PLG1. For example, the second peak wavelength PLG2 may be about 400 nm.

One of the pixel areas of the display panel 100 may display the first light L1. For example, the pixel area may display a blue image by transmitting blue light. Here, displaying light may also mean displaying an image by adjusting a transmission amount of the light provided.

According to an exemplary embodiment of the invention, the first light L1 is determined according to the applicable product specification. Thus, color purity of the pixel area may be set to a desired value by adjusting a wavelength of the first light. Thus, the color purity of the pixel area may be increased, and, as a result, color reproducibility of the display device 1000 (see FIG. 1) may be improved.

Also, the display device 1000 (see FIG. 1) may include a light-emitting material. The light-emitting material may absorb light having a predetermined wavelength and may convert a wavelength of the absorbed light. For example, the light-emitting material may absorb at least one of the first light L1 and the second light L2, and may emit first color light and second color light which are converted from the wavelength of the absorbed light.

According to an exemplary embodiment of the invention, the second light L2 has a shorter wavelength than the first light L1. A light absorption rate of the light-emitting material for a shorter wavelength may be higher than a light absorption rate of the light-emitting material for a longer wavelength. Thus, the light absorption rate of the light-emitting material may be increased by the second light L2. As a result, optical conversion efficiency of the light-emitting material may be improved. Thus, luminous efficiencies of a pixel area displaying the first color light and a pixel area displaying the second color light may be improved.

Figure 4:
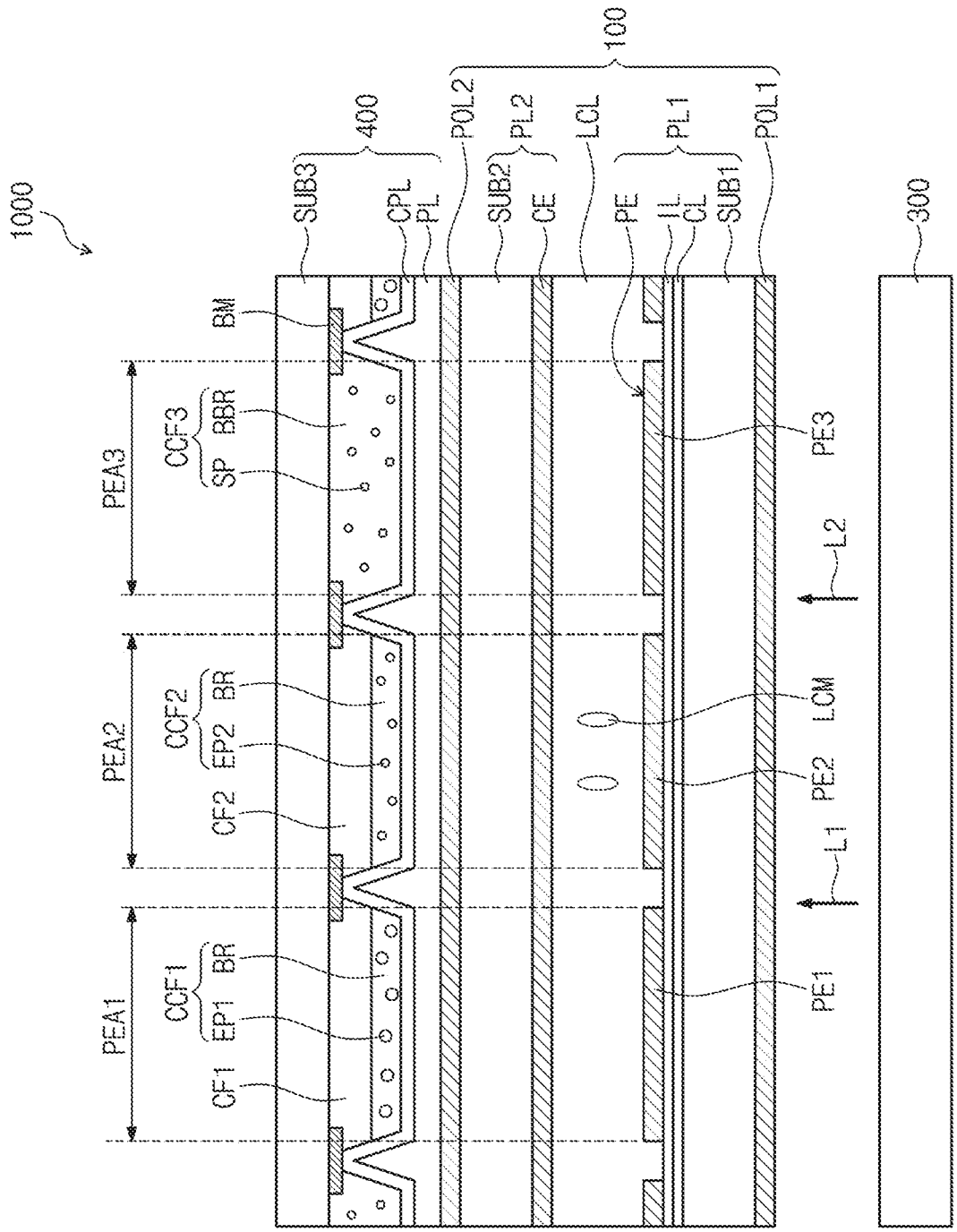
FIG. 4 is a cross-sectional view illustrating a display device according to an exemplary embodiment of the invention.

FIG. 4 is a cross-sectional view illustrating a display device according to an exemplary embodiment of the invention.

Referring to FIG. 4, the display panel 100, the light source unit 300, and a wavelength conversion member 400 of the display device 1000 are illustrated.

The display panel 100 may include a first substrate PL1, a second substrate PL2, a liquid crystal layer LCL, a first polarizing layer POL1, and a second polarizing layer POL2.

The first substrate PL1 may include a first base substrate SUB1, a circuit layer CL, an insulating layer IL, and a pixel electrode PE.

The first base substrate SUB1 may include an insulating material. For example, the first base substrate SUB1 may be a silicon substrate, a plastic substrate, an insulating film, a laminated structure, a glass substrate, or a quartz substrate. The laminated structure may include a plurality of insulating layers. The first base substrate SUB1 may be optically transparent. Accordingly, light generated from the light source unit 300 may easily reach the liquid crystal layer LCL through the first base substrate SUB1.

The circuit layer CL is disposed on the first base substrate SUB1. The circuit layer CL may include a plurality of insulating layers, a plurality of conductive layers, and a semiconductor layer. For example, the circuit layer CL may include organic/inorganic layers and transistors.

The insulating layer IL configured to cover the circuit layer CL may be disposed on the circuit layer CL, and the pixel electrodes PE may be disposed on the insulating layer IL. The pixel electrodes PE may include a first pixel electrode PE1, a second pixel electrode PE2, and a third pixel electrode PE3.

The display panel 100 may include a first pixel area PEA1, a second pixel area PEA2, and a third pixel area PEA3. Herein, the first pixel area PEA1 may be defined as an area which includes an area overlapping the first pixel electrode PE1, the second pixel area PEA2 may be defined as an area which includes an area overlapping the second pixel electrode PE2, and the third pixel area PEA3 may be defined as an area which includes an area overlapping the third pixel electrode PE3.

The second substrate PL2 may include a second base substrate SUB2 and a common electrode CE.

The second base substrate SUB2 may be an optically transparent insulating substrate. The second base substrate SUB2 may include the same material as the first base substrate SUB1. Thus, descriptions thereof will be omitted to avoid redundancy.

The common electrode CE may be disposed between the second base substrate SUB2 and the liquid crystal layer LCL. The common electrode CE may form an electric field with the pixel electrodes PE.

The liquid crystal layer LCL may be disposed between the first substrate PL1 and the second substrate PL2. The liquid crystal layer LCL may include liquid crystal molecules LCM having dielectric anisotropy. Arrangement of the liquid crystal molecules LCM may vary depending on the electric field formed between the common electrode CE and the pixel electrodes PE.

The first polarizing layer POL1 may be disposed on a top surface or a bottom surface of the first base substrate SUB1. For example, in FIG. 4, although it has been illustrated that the first polarizing layer POL1 is disposed between the first base substrate SUB1 and the light source unit 300, the exemplary embodiments of the invention are not limited thereto. For example, the first polarizing layer POL1 may be disposed between the first base substrate SUB1 and the liquid crystal layer LCL. That is, the first polarizing layer POL1 may be an in-cell type polarizer.

The second polarizing layer POL2 may be disposed on a top surface of the second base substrate SUB2. However, this is only an example, and the second polarizing layer POL2 may be disposed between the second base substrate SUB2 and the liquid crystal layer LCL. That is, the second base substrate SUB2 may be an in-cell type polarizer.

The first polarizing layer POL1 and the second polarizing layer POL2 may be absorptive polarizers which transmit light that oscillates in one direction and absorb light that oscillates in another direction orthogonal to the one direction, or may be reflective polarizers which transmit light that oscillates in one direction and reflect light that oscillates in another direction substantially perpendicular to the one direction. The first polarizing layer POL1 and the second polarizing layer POL2 may be coated polarizing layers or polarizing layers formed by deposition. Also, the first polarizing layer POL1 and the second polarizing layer POL2 may be polarizing members provided in the form of a film.

The wavelength conversion member 400 may be disposed on the display panel 100. Light passing through the display panel 100 may be incident on the wavelength conversion member 400. The wavelength conversion member 400 may absorb the incident light and may convert a wavelength of the absorbed light.

The wavelength conversion member 400 may include a third base substrate SUB3, a light-shielding portion BM, a first wavelength conversion portion CCF1, a second wavelength conversion portion CCF2, a light-transmitting portion CCF3, a first color filter layer CF1, a second color filter layer CF2, a capping layer CPL, and a planarization layer PL.

The third base substrate SUB3 may be an optically transparent insulating substrate. The third base substrate SUB3 may include the same material as the first base substrate SUB1. Thus, descriptions thereof will be omitted to avoid redundancy.

The light-shielding portion BM may be disposed on one surface of the third base substrate SUB3. The light-shielding portion BM may include an organic light-shielding material that includes a black pigment or dye. However, this is only an example, and, in another exemplary embodiment of the invention, the light-shielding portion BM may include an inorganic light-shielding material, or, in another exemplary embodiment of the invention, the wavelength conversion member 400 may not include the light-shielding portion BM.

The first color filter layer CF1 may be disposed on one surface of the third base substrate SUB3 which planarly overlaps the first pixel area PEA1, and the second color filter layer CF2 may be disposed on one surface of the third base substrate SUB3 which planarly overlaps the second pixel area PEA2. The expression "planarly overlapping" may denote overlapping in a thickness direction of the display panel 100. The thickness direction may be a direction perpendicular to a display surface.

In an exemplary embodiment of the invention, the first color filter layer CF1 may be a red color filter layer, and the second color filter layer CF2 may be a green color filter layer. However, this is only an example, and, in other exemplary embodiments of the invention, the first and second color filter layers CF1 and CF2 may be yellow or other color filter layers. Also, in another exemplary embodiment of the invention, the wavelength conversion member 400 may not include the first and second color filter layers CF1 and CF2.

The first wavelength conversion portion CCF1 may be disposed under the first color filter layer CF1, and the second wavelength conversion portion CCF2 may be disposed under the second color filter layer CF2. The first wavelength conversion portion CCF1 may planarly overlap the first pixel area PEA1, and the second wavelength conversion portion CCF2 may planarly overlap the second pixel area PEA2. The light-transmitting portion CCF3 may be disposed in an area which planarly overlaps the third pixel area PEA3.

The first wavelength conversion portion CCF1 may include a base resin BR and a first light-emitting material EP1, and the second wavelength conversion portion CCF2 may include the base resin BR and a second light-emitting material EP2. The light-transmitting portion CCF3 may not include a light-emitting material. The light-transmitting portion CCF3 may transmit the light provided from the light source unit 300 without any conversion. The light-transmitting portion CCF3 may include a base resin BBR and scattering particles SP.

The base resins BR and BBR may be polymer resins. For example, the base resins BR and BBR may be acryl-based resins, urethane-based resins, silicon-based resins, or epoxy-based resins. The base resins BR and BBR may be transparent resins. The first light-emitting material EP1 may be dispersed in the base resin BR of the first wavelength conversion portion CCF1, and the second light-emitting material EP2 may be dispersed in the base resin BR of the second wavelength conversion portion CCF2. In another exemplary embodiment of the invention, a blue dye may also be dispersed in the base resin BBR.

The first light-emitting material EP1 may emit the first color light, for example, red light by absorbing at least one of the first light L1 and the second light L2. The second light-emitting material EP2 may emit the second color light, for example, green light by absorbing at least one of the first light L1 and the second light L2. The first pixel area PEA1 may display the first color light by the first wavelength conversion portion CCF1, and the second pixel area PEA2 may display the second color light by the second wavelength conversion portion CCF2. The third pixel area PEA3 may display the third color light. For example, the first color light may be red light, and the second color light may be green light. The third color light may be the light provided from the light source unit 300, and may be blue light.

The first light-emitting material EP1 and the second light-emitting material EP2 may include a material which absorbs light and converts its wavelength to emit light with the converted wavelength. For example, the first light-emitting material EP1 and the second light-emitting material EP2 may be quantum dots.

The quantum dots may be selected from Group II-VI compounds, Group III-V compounds, Group IV-VI compounds, Group IV elements, Group IV compounds, and combinations thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and a mixture thereof, a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The Group III-V compound may be selected from the group consisting of a binary compound selected from the group consisting of GaN, GaP, GaAs, GaSb, AlN, AlP, AlAs, AlSb, InN, InP, InAs, InSb, and a mixture thereof, a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof, and a quaternary compound selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The Group IV-VI compound may be selected from the group consisting of a binary compound selected from the group consisting of SnS, SnSe, SnTe, PbS, PbSe, PbTe, and a mixture thereof, a ternary compound selected from the group consisting of SnSeS, SnSeTe, SnSTe, PbSeS, PbSeTe, PbSTe, SnPbS, SnPbSe, SnPbTe, and a mixture thereof, and a quaternary compound selected from the group consisting of SnPbSSe, SnPbSeTe, SnPbSTe, and a mixture thereof.

The Group IV element may be selected from the group consisting of silicon (Si), germanium (Ge), and a mixture thereof, and the Group IV compound may be a binary compound selected from the group consisting of SiC, SiGe, and a mixture thereof. In this case, the binary compound, the ternary compound, or the quaternary compound may be present in a particle at a uniform concentration, or may be present in the same particle while being divided into states where concentration distributions are partially different.

The quantum dot may have a core-shell structure which includes a core and a shell surrounding the core. Also, the quantum dot may have a core/shell structure in which one quantum dot surrounds another quantum dot. An interface between the core and the shell may have a concentration gradient in which a concentration of an element present in the shell is gradually decreased toward the center.

The quantum dot may be a particle having a nanometer-scale size. The quantum dot may have a full width of half maximum (FWHM) of an emission wavelength spectrum of about 45 nm or less, particularly about 40 nm or less, and more particularly about 30 nm or less, and color purity or color reproducibility may be improved within this range. Also, light emitted by the quantum dots is emitted in all directions (360 degrees), and thus, the light viewing angle may be improved.

Furthermore, the quantum dot may be in the form of a sphere, a pyramid, multi-armed or cubic nanoparticles, nanotubes, nanowires, nanofibers, or nanoplate particles. However, this is only an example, and the exemplary embodiments of the invention are not limited thereto.

The color of the light emitted by the quantum dot may be changed according to particle size. Thus, the particle size of the first light-emitting material EP1 and the particle size of the second light-emitting material EP2 may be different from each other. For example, the particle size of the first light-emitting material EP1 may be greater than the particle size of the second light-emitting material EP2. In this case, the first light-emitting material EP1 may emit light having a longer wavelength than the second light-emitting material EP2.

The first color filter layer CF1 may absorb light, which has not been converted by the first light-emitting material EP1, from the light that has passed through the first wavelength conversion portion CCF1, and the second color filter layer CF2 may absorb light, which has not been converted by the second light-emitting material EP2, from the light that has passed through the second wavelength conversion portion CCF2. Also, the first and second color filter layers CF1 and CF2 may also function to prevent external light from being incident on the first wavelength conversion portion CCF1 and the second wavelength conversion portion CCF2.

In the first pixel area PEA1 and the second pixel area PEA2, since the first light-emitting material EP1 and the second light-emitting material EP2 absorb light and then emit the light in all directions (360 degrees), the viewing angle of the light emitted from the first and second pixel areas PEA1 and PEA2 may be improved. Thus, the scattering particles SP may be provided to uniformize front brightness and lateral brightness of light emitted from the third pixel area PEA3. However, in another exemplary embodiment of the invention, the scattering particles SP may be omitted.

The capping layer CPL may cover the first wavelength conversion portion CCF1, the second wavelength conversion portion CCF2, and the light-transmitting portion CCF3. The capping layer CPL may have a single layer or multilayer structure configured to include an inorganic layer, or may have a multilayer structure configured to include an inorganic layer and an organic layer. The inorganic layer may include silicon nitride or silicon oxide.

The planarization layer PL may be disposed under the capping layer CPL. The planarization layer PL may include an organic material.

In another exemplary embodiment of the invention, the second base substrate SUB2 may be omitted. In this case, the second polarizing layer POL2 may be provided to the planarization layer PL. For example, the second polarizing layer POL2 may be provided to the planarization layer PL by a patterning method, for example, a nanoimprint method. Also, the common electrode CE may be disposed under the second polarizing layer POL2.

Figure 5:
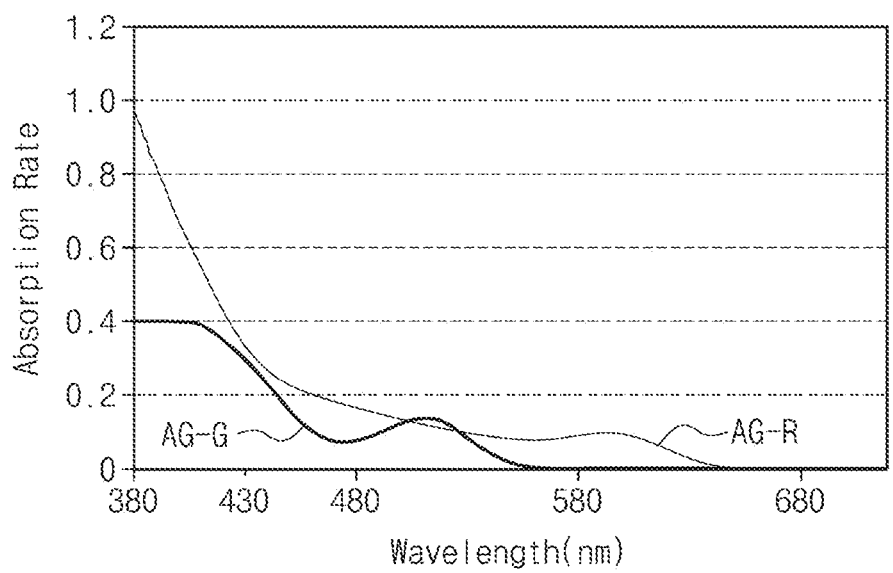
FIG. 5 illustrates absorption spectra of a first light-emitting material and a second light-emitting material.
Figure 6:
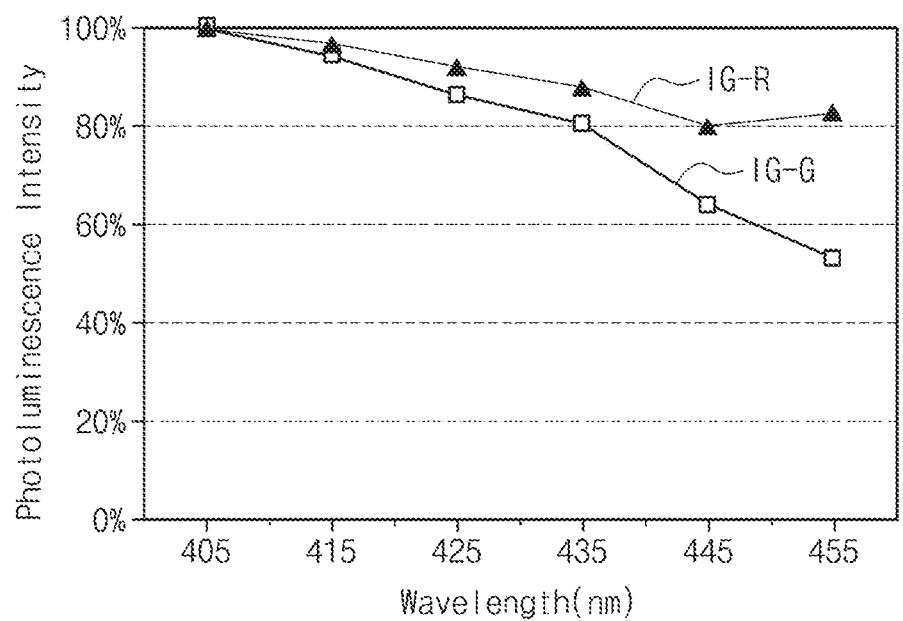
FIG. 6 is a graph illustrating photoluminescence intensities of the first light-emitting material and the second light-emitting material according to a wavelength of light.

FIG. 5 illustrates absorption spectra of the first light-emitting material EP1 and the second light-emitting material EP2, and FIG. 6 is a graph illustrating photoluminescence intensities of the first light-emitting material EP1 and the second light-emitting material EP2 according to a wavelength of light. In FIGS. 5 and 6, light absorption rates and photoluminescence intensities of quantum dots based on cadmium (Cd) according to the wavelength are measured.

A first spectrum AG-R of FIG. 5 illustrates the absorption spectrum of the first light-emitting material EP1 (see FIG. 4), and a second spectrum AG-G of FIG. 5 illustrates the absorption spectrum of the second light-emitting material EP2 (see FIG. 4). A first graph IG-R of FIG. 6 illustrates the photoluminescence intensity of the first light-emitting material EP1 according to the wavelength of the light emitted from the light source, and a second graph IG-G of FIG. 6 illustrates the photoluminescence intensity of the second light-emitting material EP2 according to the wavelength of the light emitted from the light source.

Referring to the first and second spectra AG-R and AG-G of FIG. 5, within a specific wavelength range, the graph illustrates that the first light-emitting material EP1 and the second light-emitting material EP2 have a tendency that the light having the shorter (for example, 380 nm) wavelength generally has the higher light absorption rate. For example, a light absorption rate for a 400 nm wavelength may be higher than a light absorption rate for a 450 nm wavelength. The light having higher light absorption rate generally has improved optical conversion efficiency. Thus, optical conversion efficiency in a short wavelength range may be higher than optical conversion efficiency in a long wavelength range.

The first and second graphs IG-R and IG-G of FIG. 6 are graphs based on photoluminescence intensities from the first light-emitting material EP1 and the second light-emitting material EP2 when light having a wavelength of about 405 nm is incident on the first light-emitting material EP1 and the second light-emitting material EP2. For example, when the light having a wavelength of about 405 nm is incident on the first light-emitting material EP1 and the second light-emitting material EP2, the photoluminescence intensity from each of the first light-emitting material EP1 and the second light-emitting material EP2 is expressed as 100%, and the photoluminescence intensity when light having another wavelength is incident is expressed as a relative value. The first and second graphs IG-R and IG-G show a tendency that the longer the wavelength is, the lower the photoluminescence intensity may be. This tendency is similar to the absorption rate of light.

According to the exemplary embodiment of the invention, a peak wavelength of the first light L1 (see FIG. 2) may be determined according to the applicable product specification. For example, the peak wavelength of the first light L1 may be determined by considering color coordinates of the pixel PX. A peak wavelength of the second light L2 (see FIG. 2) may be determined by considering the light absorption rates and photoluminescence intensities of the first and second light-emitting materials EP1 and EP2. For example, the peak wavelength of the second light L2 may be smaller than the peak wavelength of the first light L1. Thus, the display device 1000 (see FIG. 1) may have both color reproducibility and luminous efficiency improved by the light source unit 300 (see FIG. 2) including the first light source 301 (see FIG. 2) and the second light source 302 (see FIG. 2).

Figure 7:
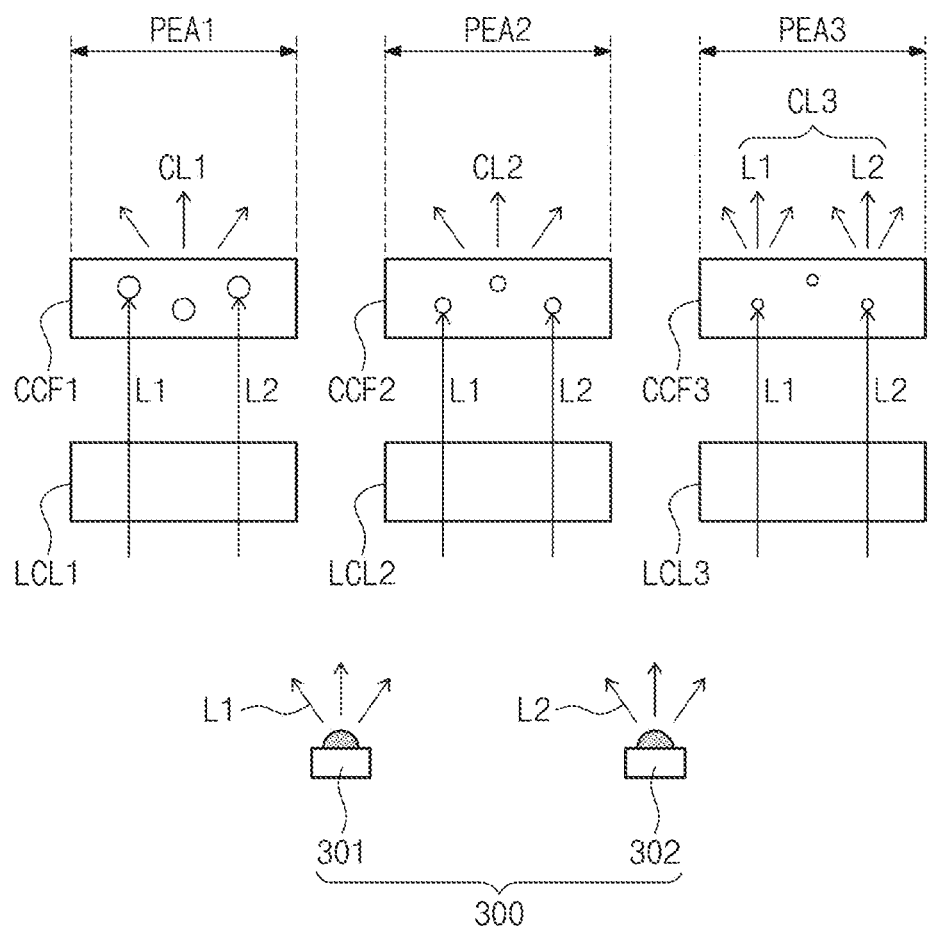
FIG. 7 is a schematic diagram for describing a driving method according to an exemplary embodiment of the invention.

FIG. 7 is a schematic diagram for describing a driving method according to an exemplary embodiment of the invention.

Referring to FIG. 7, some configurations of the display panel 100 (see FIG. 4) and the wavelength conversion member 400 (see FIG. 4) are illustrated. A first liquid crystal portion LCL1, a second liquid crystal portion LCL2, and a third liquid crystal portion LCL3 are illustrated as the some configurations of the display panel 100, and the first wavelength conversion portion CCF1, the second wavelength conversion portion CCF2, and the light-transmitting portion CCF3 are illustrated as the some configurations of the wavelength conversion member 400.

The liquid crystal layer LCL (see FIG. 4) may include the first liquid crystal portion LCL1, the second liquid crystal portion LCL2, and the third liquid crystal portion LCL3. The first liquid crystal portion LCL1 is included in the first pixel area PEA1, the second liquid crystal portion LCL2 is included in the second pixel area PEA2, and the third liquid crystal portion LCL3 is included in the third pixel area PEA3.

The first liquid crystal portion LCL1, the second liquid crystal portion LCL2, and the third liquid crystal portion LCL3 may adjust transmission amounts of the first and second lights L1 and L2 provided from the light source unit 300.

In an exemplary embodiment of the invention, the first light source 301 and the second light source 302 may emit light at the same time. Thus, the first liquid crystal portion LCL1, the second liquid crystal portion LCL2, and the third liquid crystal portion LCL3 may adjust the transmission amounts of the first light L1 and the second light L2.

In a case in which a white image is displayed, the first liquid crystal portion LCL1, the second liquid crystal portion LCL2, and the third liquid crystal portion LCL3 may transmit the first and second lights L1 and L2. Thus, all of the first pixel area PEA1, the second pixel area PEA2, and the third pixel area PEA3 may display light.

The first wavelength conversion portion CCF1 may absorb the first and second lights L1 and L2 and may convert them into first color light CL1. A peak wavelength of the first color light CL1 may have a value within a wavelength range of red light. For example, the peak wavelength of the first color light CL1 may have a value of about 620 nm or more to about 780 nm or less.

The second wavelength conversion portion CCF2 may absorb the first and second lights L1 and L2 and may convert them into second color light CL2. A peak wavelength of the second color light CL2 may have a value within a wavelength range of green light. For example, the peak wavelength of the second color light CL2 may have a value of about 501 nm or more to about 580 nm or less.

The light-transmitting portion CCF3 may emit third color light CL3 by transmitting the first and second lights L1 and L2. The third color light CL3 includes the first and second lights L1 and L2 and may be blue light.

The first pixel area PEA1 may display the first color light CL1, the second pixel area PEA2 may display the second color light CL2, and the third pixel area PEA3 may display the third color light CL3.

According to an exemplary embodiment of the invention, since both of the first light source 301 and the second light source 302 emit light, the light source driver 240 of FIG. 1 may be omitted.

In an exemplary embodiment of the invention, the intensity of the first light L1 and the intensity of the second light L2 may be equal to each other. However, the exemplary embodiments of the invention are not limited thereto. For example, in another exemplary embodiment of the invention, the intensity of the first light L1 may be greater than the intensity of the second light L2. In this case, the intensity of the first light L1 included in the third color light CL3 is greater than the intensity of the second light L2. That is, since the intensity of the first light L1 determined by considering the color coordinates is greater than the intensity of the second light L2, a decrease in color purity of the third color light CL3 may be mitigated.

Figure 8:
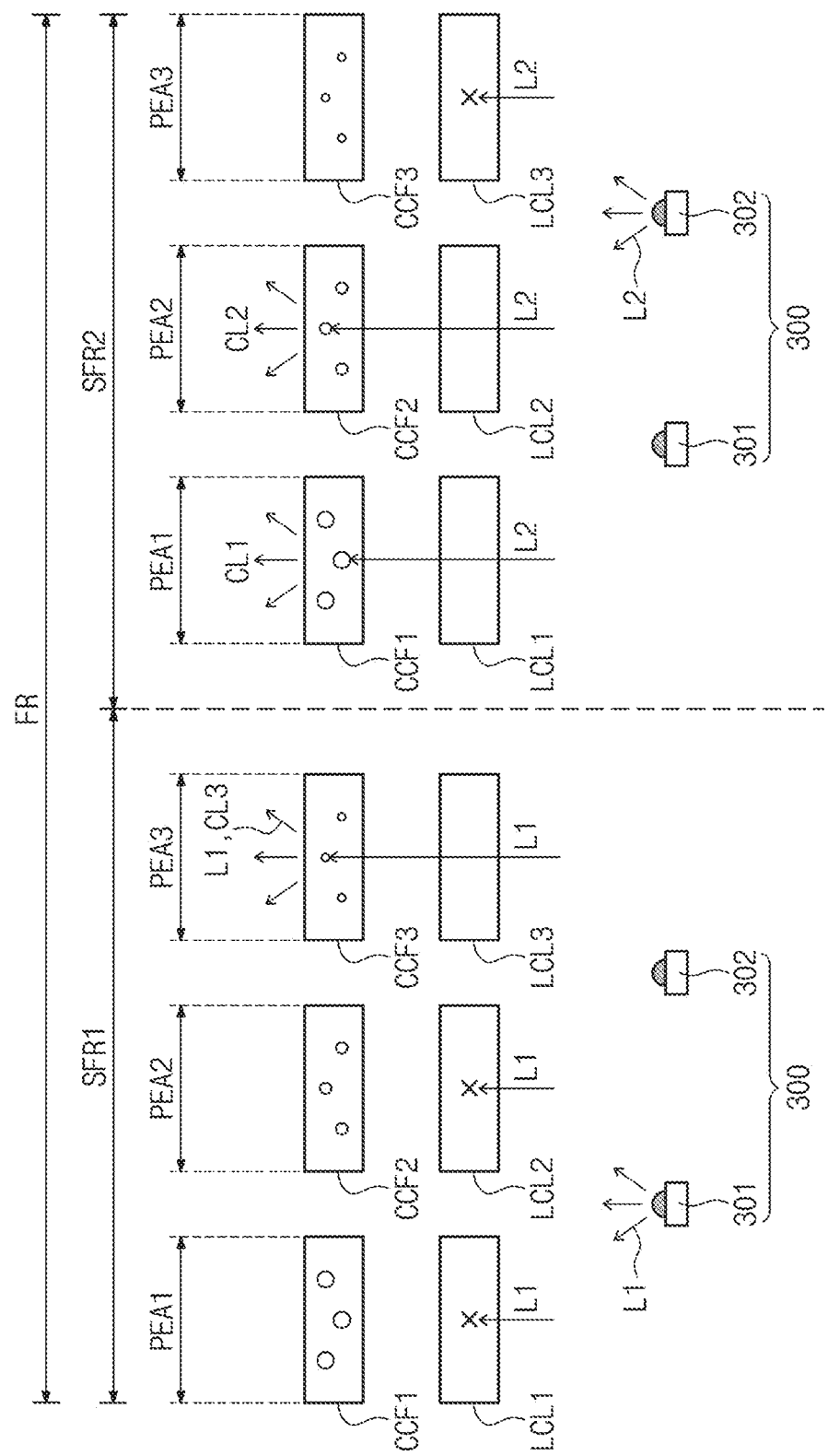
FIG. 8 is a schematic diagram for describing a time-division driving method according to an exemplary embodiment of the invention.

FIG. 8 is a schematic diagram for describing a time-division driving method according to an exemplary embodiment of the invention.

Referring to FIG. 8, the display panel 100 (see FIG. 1) may display an image on a frame-by-frame basis. One frame FR may include a first sub-frame SFR1 and a second sub-frame SFR2, which are separate time divisions of the frame FR.

In an exemplary embodiment of the invention, the light source driver 240 (see FIG. 1) may receive the third control signal CS3 (see FIG. 1) from the signal controller 210 (see FIG. 1) and may alternately turn on the first light source 301 and the second light source 302 in response to the third control signal CS3. The first light source 301 may emit light during the first sub-frame SFR1, and the second light source 302 may emit light during the second sub-frame SFR2.

The third liquid crystal portion LCL3 may be synchronized with the first light source 301 to change the arrangement of the liquid crystal molecules, and the first liquid crystal portion LCL1 and the second liquid crystal portion LCL2 may be synchronized with the second light source 302 to change the arrangement of the liquid crystal molecules. For example, in a case in which the first light source 301 is turned on, the first liquid crystal portion LCL1 and the second liquid crystal portion LCL2 may block the light provided from the light source unit 300. Thus, during the first sub-frame SFR1, the display panel 100 (see FIG. 1) may only display an image by the third pixel area PEA3. Also, since the display of the light is blocked in the first and second pixel areas PEA1 and PEA2, images may not be displayed by the first and second pixel areas PEA1 and PEA2. Furthermore, in a case in which the second light source 302 is turned on, the third liquid crystal portion LCL3 may block the light provided from the light source unit 300. Thus, during the second sub-frame SFR2, the display panel 100 may only display the images by the first and second pixel areas PEA1 and PEA2. Also, since display of the light is blocked in the third pixel area PEA3, the image may not be displayed by the third pixel area PEA3. Accordingly, an image of one frame, in which the image displayed during the first sub-frame SFR1 and the images displayed during the second sub-frame SFR2 are combined, may be provided.

In a case in which a white image is displayed, all of the first pixel area PEA1, the second pixel area PEA2, and the third pixel area PEA3 may display light. The third pixel area PEA3 displays the third color light CL3 during the first sub-frame SFR1. Since the first liquid crystal portion LCL1 and the second liquid crystal portion LCL2 block the light provided from the light source unit 300 during the first sub-frame SFR1, the first and second pixel areas PEA1 and PEA2 may not display the first and second color lights CL1 and CL2. The first and second pixel areas PEA1 and PEA2 may display the first and second color lights CL1 and CL2 during the second sub-frame SFR2. Since the third liquid crystal portion LCL3 blocks the light provided from the light source unit 300 during the second sub-frame SFR2, the third pixel area PEA3 may not display the third color light CL3.

According to an exemplary embodiment of the invention, the third pixel area PEA3 may display light by adjusting the transmission amount of the first light L1 during the first sub-frame SFR1. Also, the third pixel area PEA3 may block the display of the third color light CL3 during the second sub-frame SFR2. Thus, display of the second light L2 through the third pixel area PEA3 may be prevented. That is, the third color light CL3 may include the first light L1. Thus, the color purity of the third color light CL3 may be increased, and, as a result, the color reproducibility may be improved.

Also, the first and second pixel areas PEA1 and PEA2 may display light by adjusting the transmission amount of the second light L2 during the second sub-frame SFR2. When the second light L2 transmits through the first liquid crystal portion LCL1 and the second liquid crystal portion LCL2, the second light L2 is incident on the first wavelength conversion portion CCF1 and the second wavelength conversion portion CCF2. The first wavelength conversion portion CCF1 may emit the first color light CL1 by absorbing the second light L2, and the second wavelength conversion portion CCF2 may emit the second color light CL2 by absorbing the second light L2. Since the second light L2 has a shorter wavelength than the first light L1, light absorption rates and optical conversion efficiencies of the light-emitting materials in the first and second wavelength conversion portions CCF1 and CCF2 may be improved. Thus, luminous efficiency of the light displayed in the first pixel area PEA1 and the second pixel area PEA2 may be improved.

Figure 9:
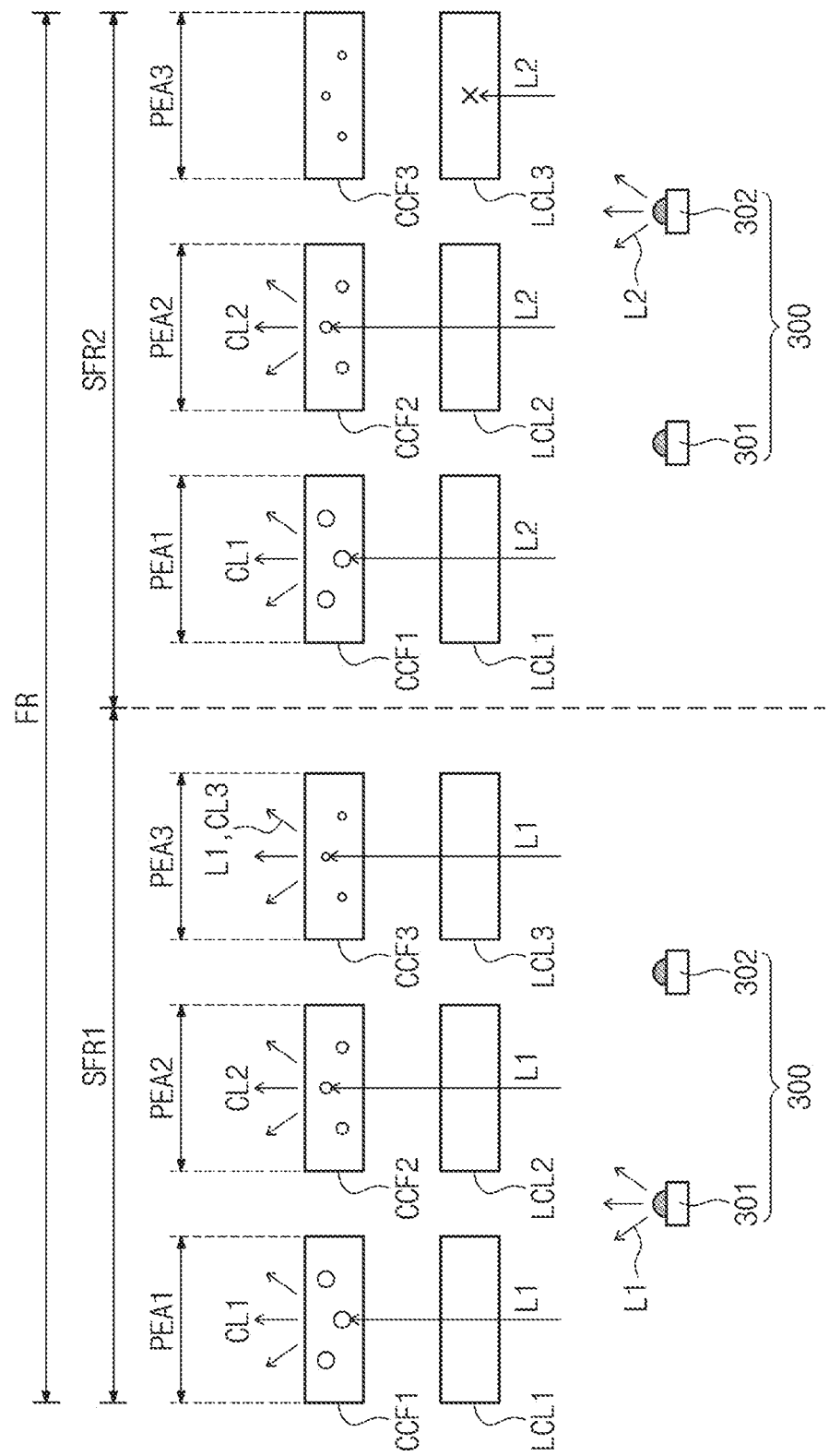
FIG. 9 is a schematic diagram for describing a time-division driving method according to an exemplary embodiment of the invention.

FIG. 9 is a schematic diagram for describing a time-division driving method according to an exemplary embodiment of the invention. In FIG. 9, points different from FIG. 8 will be described in detail.

Referring to FIG. 9, the first liquid crystal portion LCL1, the second liquid crystal portion LCL2, and the third liquid crystal portion LCL3 may be synchronized with the first light source 301 to change the arrangement of the liquid crystal molecules, and the first liquid crystal portion LCL1 and the second liquid crystal portion LCL2 may be synchronized with the second light source 302 to change the arrangement of the liquid crystal molecules.

In the first sub-frame SFR1 in which the first light source 301 is turned on, the first, second, and third pixel areas PEA1, PEA2, and PEA3 may display light by adjusting the transmission amount of the first light L1. That is, the first and second pixel areas PEA1 and PEA2 may display light in both of the first sub-frame SFR1 and the second sub-frame SFR2. Thus, luminous efficiency of the light displayed in the first pixel area PEA1 and the second pixel area PEA2 may be improved.

Figure 10A:
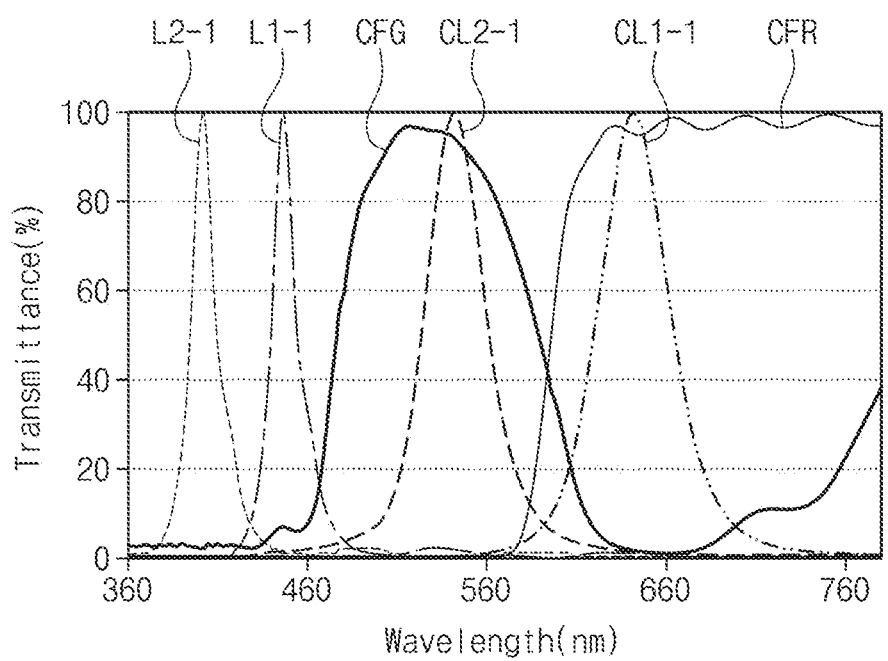
FIG. 10A illustrates transmittance spectra of a first color filter and a second color filter according to an exemplary embodiment of the invention.
Figure 10B:
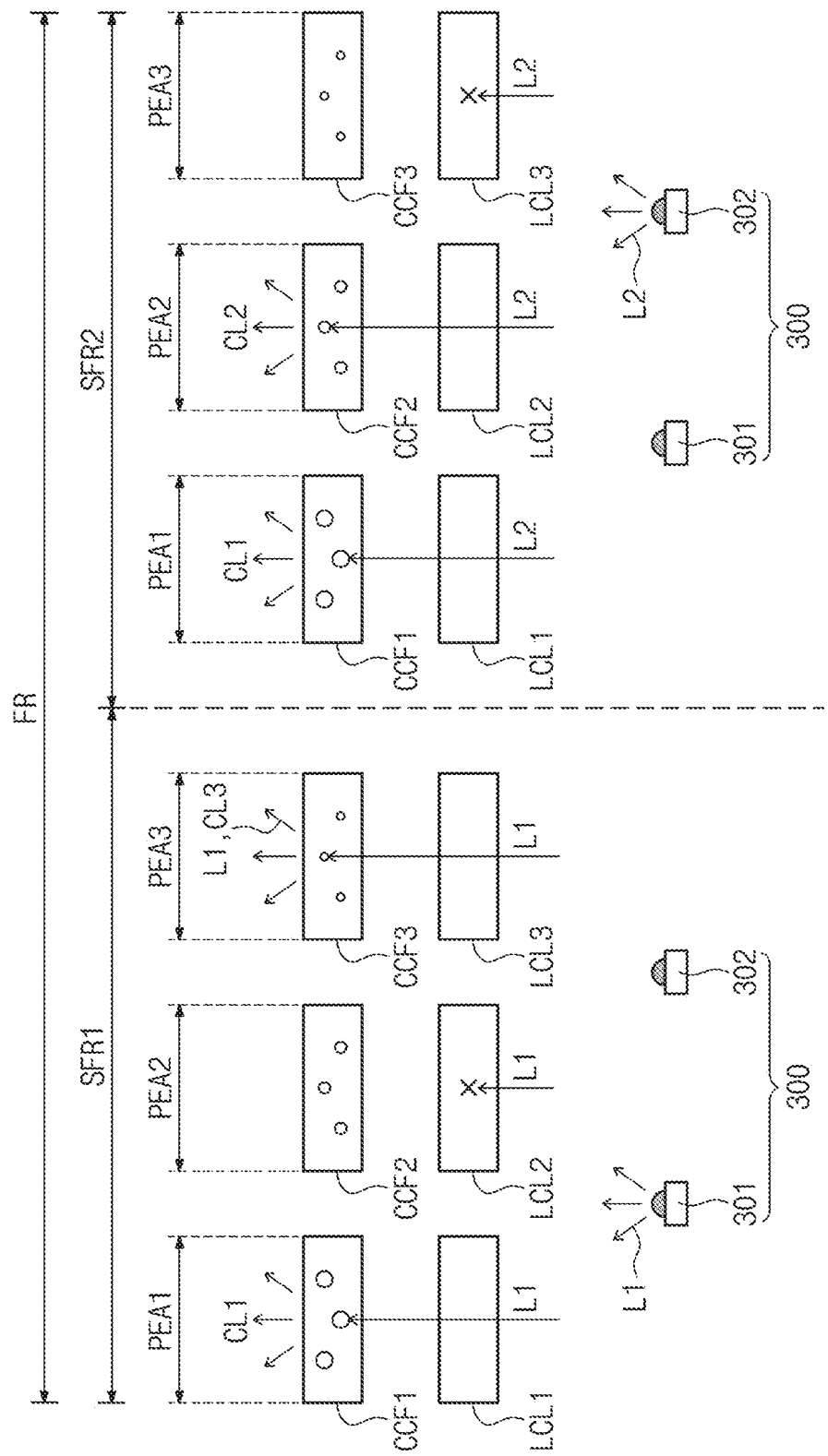
FIG. 10B is a schematic diagram for describing a time-division driving method according to an exemplary embodiment of the invention.

FIG. 10A illustrates transmittance spectra of a first color filter and a second color filter according to an exemplary embodiment of the invention. FIG. 10B is a schematic diagram for describing a time-division driving method according to an exemplary embodiment of the invention. In FIGS. 10A and 10B, points different from FIG. 8 will be described in detail.

Referring to FIG. 10A, a first spectrum CFR is a transmittance spectrum of the first color filter layer CF1 (see FIG. 4), and a second spectrum CFG is a transmittance spectrum of the second color filter layer CF2 (see FIG. 4).

Third spectrum (L1-1), fourth spectrum (L2-1), fifth spectrum (CL1-1) and sixth spectrum (CL2-1) indicated by dotted lines each illustrate a spectrum of each light for convenience of explanation. The third spectrum (L1-1) is the spectrum of the first light L1, the fourth spectrum (L2-1) is the spectrum of the second light L2, the fifth spectrum (CL1-1) is the spectrum of the first color light CL1, and the sixth spectrum (CL2-1) is the spectrum of the second color light CL2. The first color light CL1 and the second color light CL2 have longer wavelengths than the first light L1 and the second light L2, and the first color light CL1 has a longer wavelength than the second color light CL2.

The first color filter layer CF1 transmits most of the first color light CL1, and the second color filter layer CF2 transmits most of the second color light CL2. According to the second spectrum CFG, the graph illustrates that the second color filter layer CF2 may not only transmit the second color light CL2, but may also transmit a portion of the first light L1. Thus, at least a part of the first light L1 which is not converted by the second wavelength conversion portion CCF2 may be transmitted through the second color filter layer CF2.

Referring to FIG. 10B, the first liquid crystal portion LCL1 and the third liquid crystal portion LCL3 may be synchronized with the first light source 301 to change the arrangement of the liquid crystal molecules, and the first liquid crystal portion LCL1 and the second liquid crystal portion LCL2 may be synchronized with the second light source 302 to change the arrangement of the liquid crystal molecules.

In the first sub-frame SFR1 in which the first light source 301 is turned on, the first and third pixel areas PEA1 and PEA3 may display light by adjusting the transmission amount of the first light L1. That is, the first pixel area PEA1 may display light in both of the first sub-frame SFR1 and the second sub-frame SFR2, the second pixel area PEA2 may display light in the second sub-frame SFR2, and the third pixel area PEA3 may display light in the first sub-frame SFR1.

That is, when the first light source 301 emits the first light L1, the second liquid crystal portion LCL2 may block the first light L1 provided from the first light source 301. Thus, the first light L1 is not provided to the second color filter layer CF2 during the first sub-frame SFR1. Therefore, a phenomenon in which the first light L1 transmits through the second color filter layer CF2 may be prevented. As a result, color purity of the second color light CL2 displayed in the second pixel area PEA2 in one frame may be increased, and, as a result, the color reproducibility may be improved.

Figure 11:
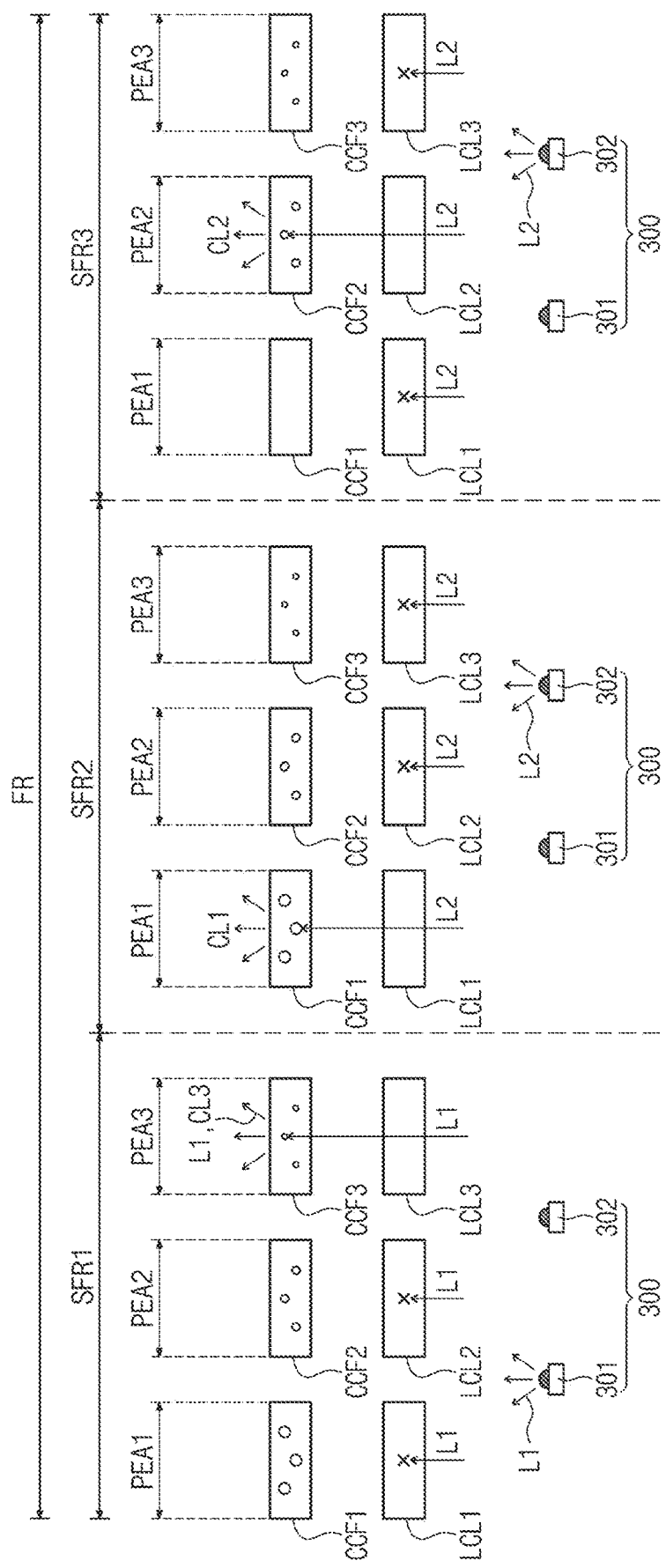
FIG. 11 is a schematic diagram for describing a time-division driving method according to an exemplary embodiment of the invention.

FIG. 11 is a schematic diagram for describing a time-division driving method according to an exemplary embodiment of the invention.

Referring to FIG. 11, the display panel 100 (see FIG. 1) may display an image on a frame-by-frame basis. One frame FR may include a first sub-frame SFR1, a second sub-frame SFR2, and a third sub-frame SFR3 which are separate time divisions of the frame FR.

The first light source 301 may emit light during the first sub-frame SFR1, and the second light source 302 may emit light during the second sub-frame SFR2 and the third sub-frame SFR3.

An image displayed during the first sub-frame SFR1 is an image provided by the third pixel area PEA3, an image displayed during the second sub-frame SFR2 is an image provided by the first pixel area PEA1, and an image displayed during the third sub-frame SFR3 is an image provided by the second pixel area PEA2. A user may recognize a combination of the images provided during the first to third sub-frames SFR1, SFR2, and SFR3.

According to an exemplary embodiment of the invention, since the timing at which light is displayed in each pixel area is separated, color purity of the light displayed in each pixel area may be improved, and, as a result, the color reproducibility may be improved. Also, since the light source unit 300 is time-divisionally driven according to each pixel area, power consumption may be reduced.

Figure 12:
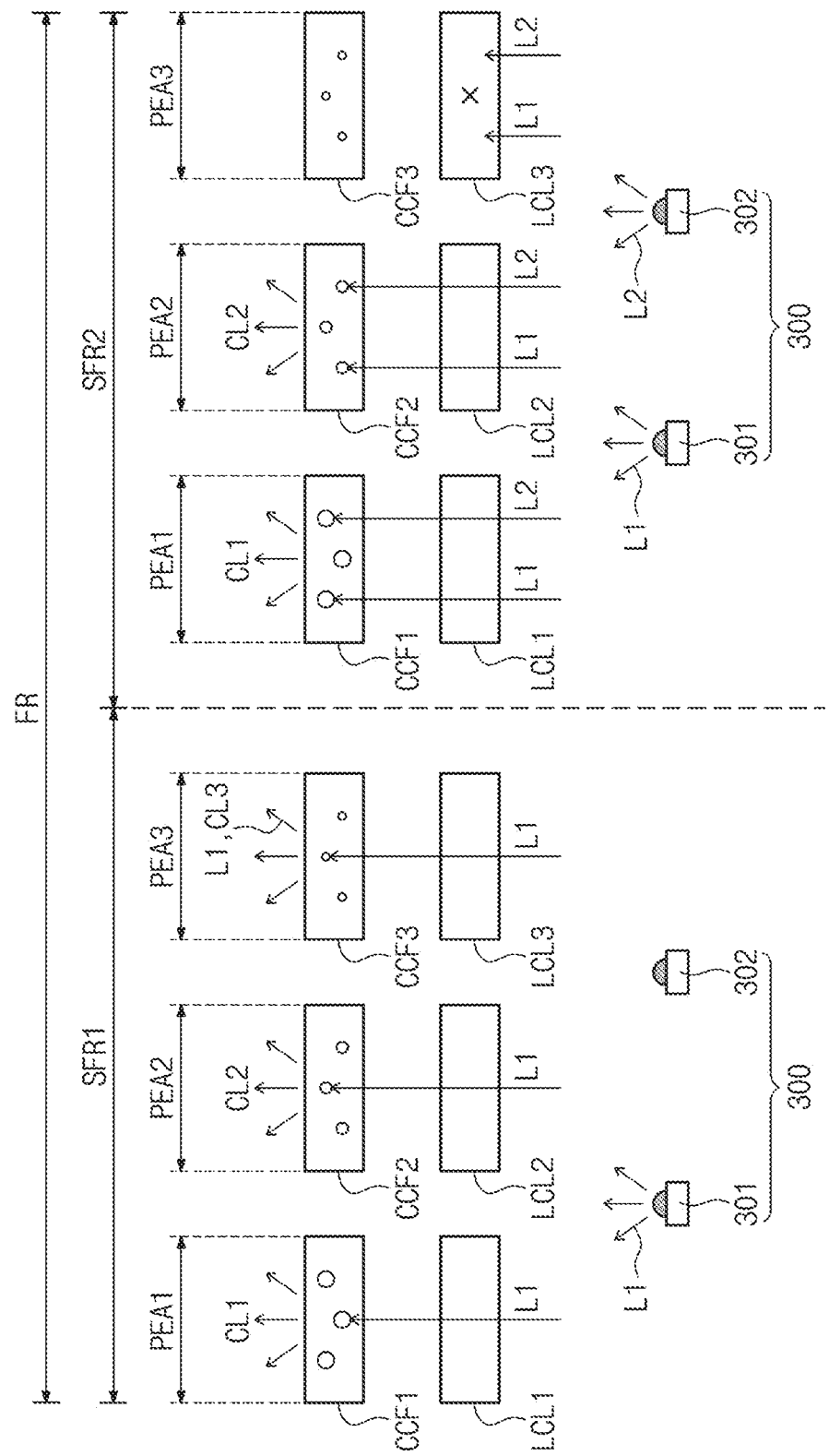
FIG. 12 is a schematic diagram for describing a time-division driving method according to an exemplary embodiment of the invention.

FIG. 12 is a schematic diagram for describing a time-division driving method according to an exemplary embodiment of the invention. In FIG. 12, points different from FIG. 8 will be described in detail.

The first light source 301 may emit light in both of the first sub-frame SFR1 and the second sub-frame SFR2, and the second light source 302 may emit light during the second sub-frame SFR2.

The first, second, and third liquid crystal portions LCL1, LCL2, and LCL3 of the first, second, and third pixel areas PEA1, PEA2, and PEA3 display light by adjusting the transmission amount of the first light L1 during the first sub-frame SFR1. The first and second liquid crystal portions LCL1 and LCL2 display light by adjusting the transmission amount of the first light L1 and the second light L2 during the second sub-frame SFR2. The third liquid crystal portion LCL3 blocks the first light L1 and the second light L2 during the second sub-frame SFR2. That is, the third color light CL3 is not displayed in the third pixel area PEA3 during the second sub-frame SFR2.

According to an exemplary embodiment of the invention, since both of the first light L1 and the second light L2 are provided during the second sub-frame SFR2, luminous efficiency of the light emitted from the first pixel area and the second pixel area PEA1 and PEA2 may be improved. Also, since the second light L2 is not provided during the first sub-frame SFR1 in which the light is displayed in the third pixel area PEA3, color purity of the third color light CL3 may be improved. Thus, the display device 1000 (see FIG. 1) having both improved luminous efficiency and color purity may be provided.

Figure 13:
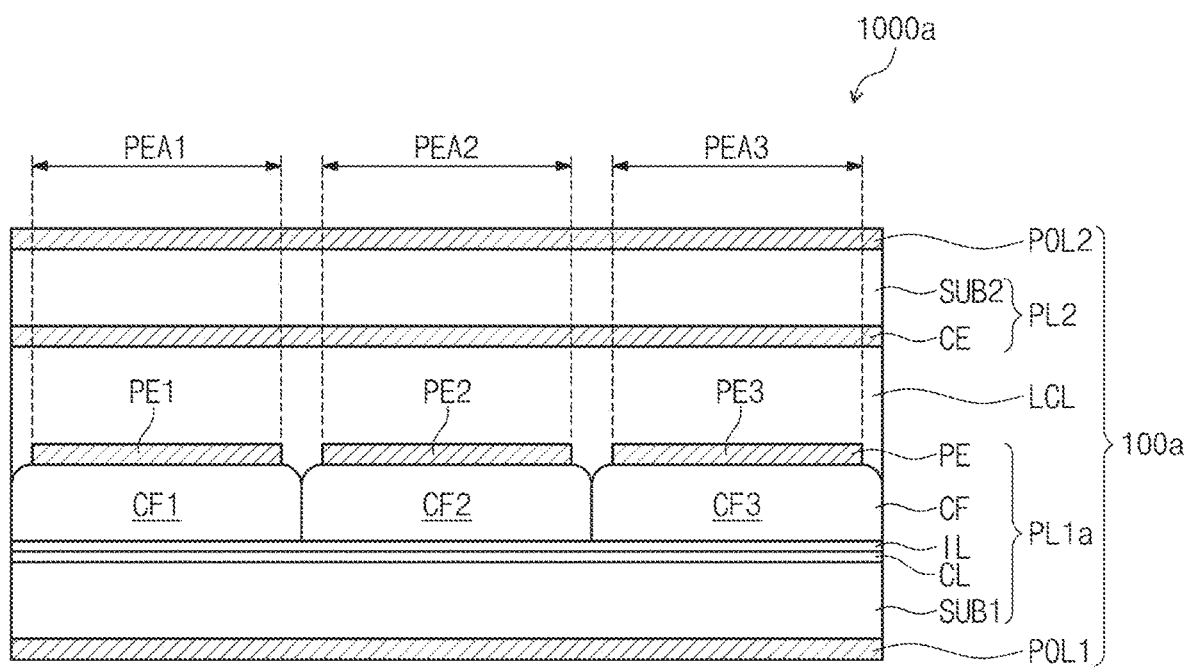
FIG. 13 is a cross-sectional view illustrating a display device according to an exemplary embodiment of the invention.
Figure 13:
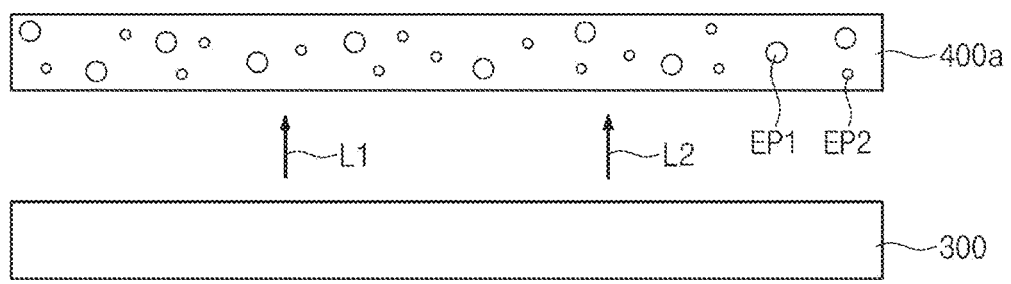

FIG. 13 is a cross-sectional view illustrating a display device according to an exemplary embodiment of the invention. In describing FIG. 13, the same reference numerals are given to the same elements as those described in FIG. 4, and descriptions thereof will be omitted to avoid redundancy.

Referring to FIG. 13, a display panel 100a, a light source unit 300, and a wavelength conversion member 400a of a display device 1000a are illustrated.

The display panel 100a may include a first substrate PL1a, a second substrate PL2, a liquid crystal layer LCL disposed between the first substrate PL1a and the second substrate PL2, a first polarizing layer POL1, and a second polarizing layer POL2.

The first substrate PL1a may include a first base substrate SUB1, a circuit layer CL, a pixel electrode PE, an insulating layer IL, and a color filter layer CF. The color filter layer CF may include a first color filter layer CF1 disposed in a first pixel area PEA1, a second color filter layer CF2 disposed in a second pixel area PEA2, and a third color filter layer CF3 disposed in a third pixel area PEA3. In another exemplary embodiment of the invention, the first to third color filter layers CF1, CF2, and CF3 may be included in the second substrate PL2. In this case, the first to third color filter layers CF1, CF2, and CF3 may be disposed between the second base substrate SUB2 and the common electrode CE.

The wavelength conversion member 400a may be disposed under the display panel 100a. The wavelength conversion member 400a may include a first light-emitting material EP1 and a second light-emitting material EP2. The first and second light-emitting materials EP1 and EP2 may be a material which absorbs light having a predetermined wavelength and converts the wavelength of the absorbed light. For example, the first and second light-emitting materials EP1 and EP2 may be quantum dots.

The light source unit 300 may provide at least one of the first light L1 and the second light L2 to the wavelength conversion member 400a. The first light-emitting material EP1 may emit a first color light by absorbing at least one of the first light L1 and the second light L2. The second light-emitting material EP2 may emit a second color light by absorbing at least one of the first light L1 and the second light L2. Also, light not absorbed by the first light-emitting material EP1 and the second light-emitting material EP2 may transmit through the wavelength conversion member 400a.

The first light L1 may be blue light having a first peak wavelength, and the second light L2 may be blue light having a second peak wavelength. The first peak wavelength may be longer than the second peak wavelength. The first color light may be red light, and the second color light may be green light.

The first color filter layer CF1 may transmit the first color light, the second color filter layer CF2 may transmit the second color light, and the third color filter layer CF3 may transmit blue light (e.g., the first light L1 or the second light L2).

According to an exemplary embodiment of the invention, the first light L1 may be determined according to the applicable product specification. For example, the peak wavelength of the first light L1 may be determined by considering the color coordinates, and, as a result, the third pixel area PEA3 may display the first light L1. Thus, color purity of the light displayed in the third pixel area PEA3 may be improved. Also, the peak wavelength of the second light L2 may be determined to be a smaller value than the peak wavelength of the first light L1. Thus, light absorption rates and optical conversion efficiencies of the first light-emitting material EP1 and the second light-emitting material EP2 may be improved. As a result, luminous efficiency of the light displayed in the first pixel area PEA1 and the second pixel area PEA2 may be improved. Therefore, the display device 1000a having both improved luminous efficiency and color purity may be provided.

Figure 14:
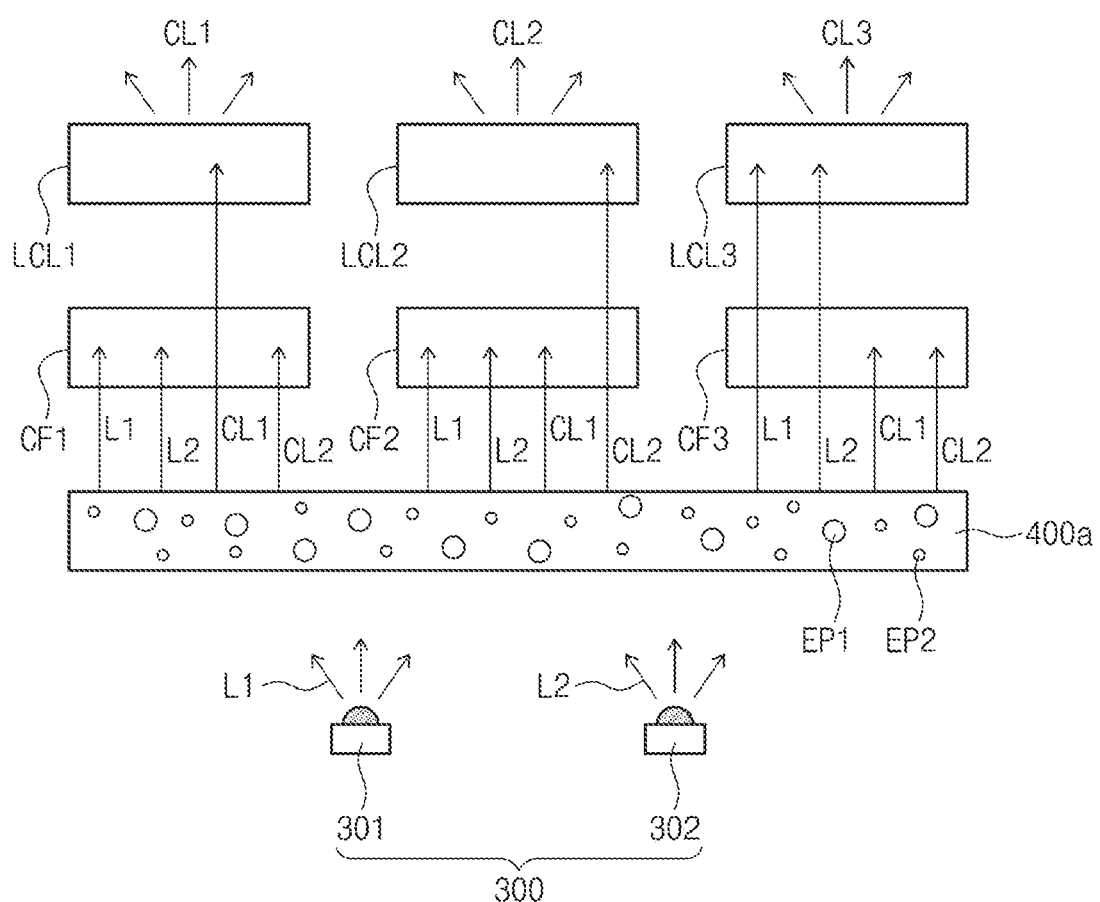
FIG. 14 is a schematic diagram for describing a driving method according to an exemplary embodiment of the invention.

FIG. 14 is a schematic diagram for describing a driving method according to an exemplary embodiment of the invention.

Referring to FIGS. 13 and 14, the display panel 100a (see FIG. 13) and the wavelength conversion member 400a are illustrated. According to the exemplary embodiment, the display panel 100a may include a first liquid crystal portion LCL1, a second liquid crystal portion LCL2, a third liquid crystal portion LCL3, the first color filter layer CF1, the second color filter layer CF2, and the third color filter layer CF3.

The first liquid crystal portion LCL1, the second liquid crystal portion LCL2, and the third liquid crystal portion LCL3 may adjust transmission amounts of the incident lights (for example, the first light L1, the second light L2, the first color light CL1, and the second color light CL2). The first color filter layer CF1, the second color filter layer CF2, and the third color filter layer CF3 may transmit light having a predetermined wavelength among the incident lights.

FIG. 14 exemplarily illustrates that light transmitted through the first color filter layer CF1, the second color filter layer CF2, and the third color filter layer CF3 is incident on the first liquid crystal portion LCL1, the second liquid crystal portion LCL2, and the third liquid crystal portion LCL3, respectively. However, in another exemplary embodiment of the invention, a structure, in which light passing through the first liquid crystal portion LCL1, the second liquid crystal portion LCL2, and the third liquid crystal portion LCL3 is incident on the first color filter layer CF1, the second color filter layer CF2, and the third color filter layer CF3, respectively, may be provided.

In an exemplary embodiment of the invention, the first light source 301 and the second light source 302 may emit light at the same time. Thus, the first light L1 and the second light L2 may be incident on the wavelength conversion member 400a at the same time. Since both of the first light source 301 and the second light source 302 emit light, the light source driver 240 of FIG. 1 may be omitted.

Peak wavelengths of the first light L1 and the second light L2 may have a value of about 365 nm or more to about 500 nm or less, a first peak wavelength of the first light L1 may be in a range of about 450 nm or more to about 500 nm or less, and a second peak wavelength of the second light L2 may be in a range of about 365 nm or more to less than the first peak wavelength.

A portion of the first light L1 and the second light L2 may be converted into the first color light CL1 by the first light-emitting material EP1 of the wavelength conversion member 400a, and another portion thereof may be converted into the second color light CL2 by the second light-emitting material EP2 of the wavelength conversion member 400a. Also, yet another portion of the first light L1 and the second light L2 may transmit through the wavelength conversion member 400a.

Thus, the wavelength conversion member 400a may provide the first light L1, the second light L2, the first color light CL1, and the second color light CL2 to the display panel 100a. The first color filter layer CF1 may transmit the first color light CL1 and may absorb the first light L1, the second light L2, and the second color light CL2. The second color filter layer CF2 may transmit the second color light CL2 and may absorb the first light L1, the second light L2, and the first color light CL1. The third color filter layer CF3 may transmit the first light L1 and the second light L2 and may absorb the first color light CL1 and the second color light CL2.

Figure 15:
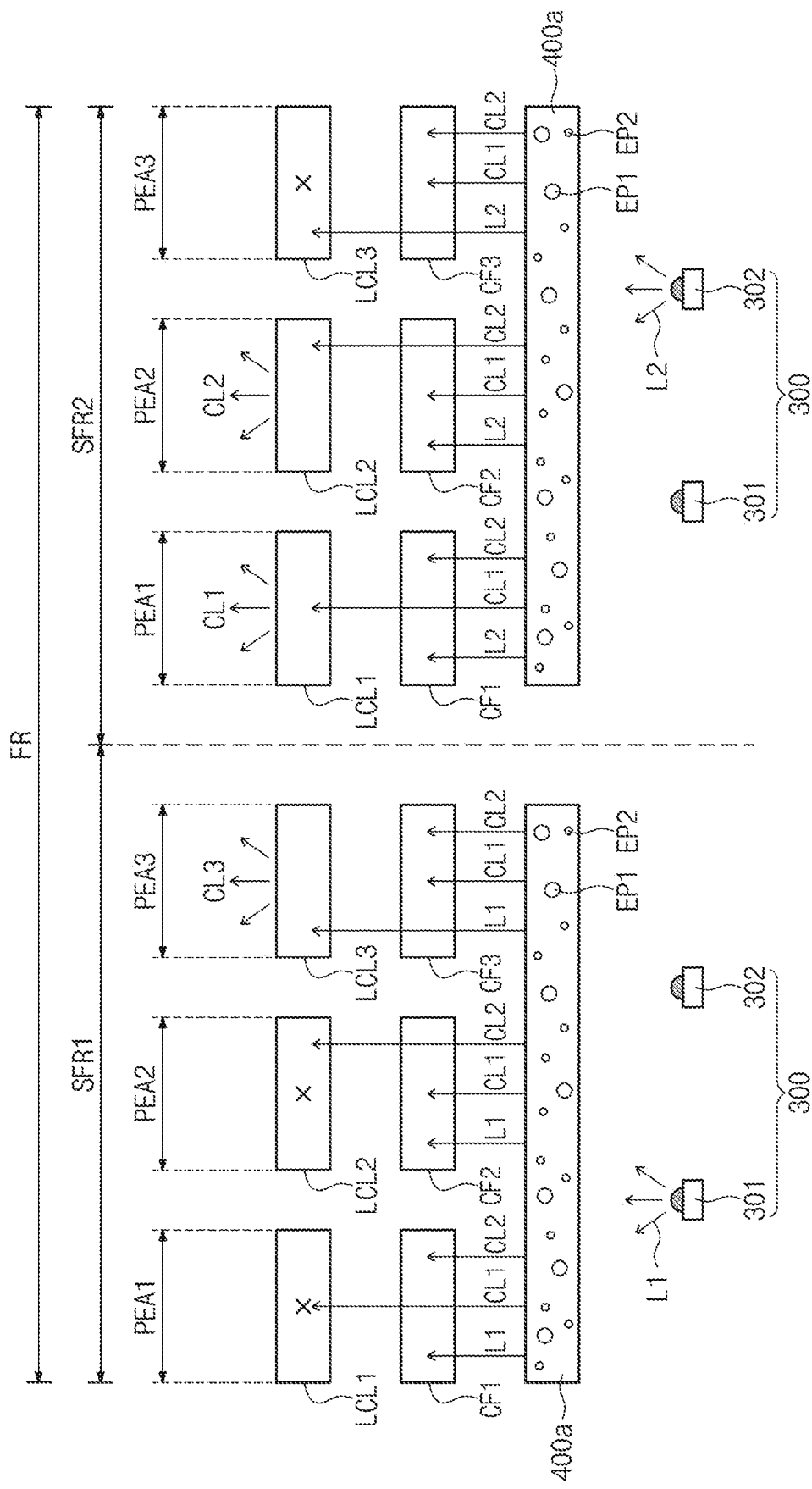
FIG. 15 is a schematic diagram for describing a time-division driving method according to an exemplary embodiment of the invention.

FIG. 15 is a schematic diagram for describing a time-division driving method according to an exemplary embodiment of the invention.

Referring to FIGS. 13 and 15, the display panel 100a (see FIG. 13) may display an image on a frame-by-frame basis. One frame FR may include a first sub-frame SFR1 and a second sub-frame SFR2 which are separate time divisions of the frame FR. The first light source 301 may emit light during the first sub-frame SFR1, and the second light source 302 may emit light during the second sub-frame SFR2.

The wavelength conversion member 400a may provide the first light L1, the first color light CL1, and the second color light CL2 to the display panel 100a during the first sub-frame SFR1. The wavelength conversion member 400a may provide the second light L2, the first color light CL1, and the second color light CL2 to the display panel 100a during the second sub-frame SFR2.

The third liquid crystal portion LCL3 may be synchronized with the first light source 301 to change the arrangement of the liquid crystal molecules, and the first liquid crystal portion LCL1 and the second liquid crystal portion LCL2 may be synchronized with the second light source 302 to change the arrangement of the liquid crystal molecules.

According to an exemplary embodiment of the invention, the third pixel area PEA3 may display light by adjusting the transmission amount of the first light L1 during the first sub-frame SFR1. Also, the third pixel area PEA3 may block the display of the second light L2 during the second sub-frame SFR2. That is, the third color light CL3 may include the first light L1. Thus, the color purity of the third color light CL3 may be increased, and, as a result, the color reproducibility may be improved.

Also, the first and second pixel areas PEA1 and PEA2 may display light by adjusting the transmission amounts of the first color light CL1 and the second color light CL2 during the second sub-frame SFR2, respectively. The first color light CL1 and the second color light CL2 in the second sub-frame SFR2 are light converted from the second light L2. Since the second light L2 has a shorter wavelength than the first light L1, light absorption rates of the first and second light-emitting materials EP1 and EP2 are high, and thus, optical conversion efficiency may be improved. Therefore, optical efficiency of the light displayed in the first and second pixel areas PEA1 and PEA2 may be improved. The display device 1000a of FIG. 13 has been described by using one time-division driving method illustrated in FIG. 15 as an example. However, the time-division driving methods previously described in FIGS. 9, 10B, 11, and 12 may also be applied to the display device 1000a of FIG. 13.

Figure 16A:
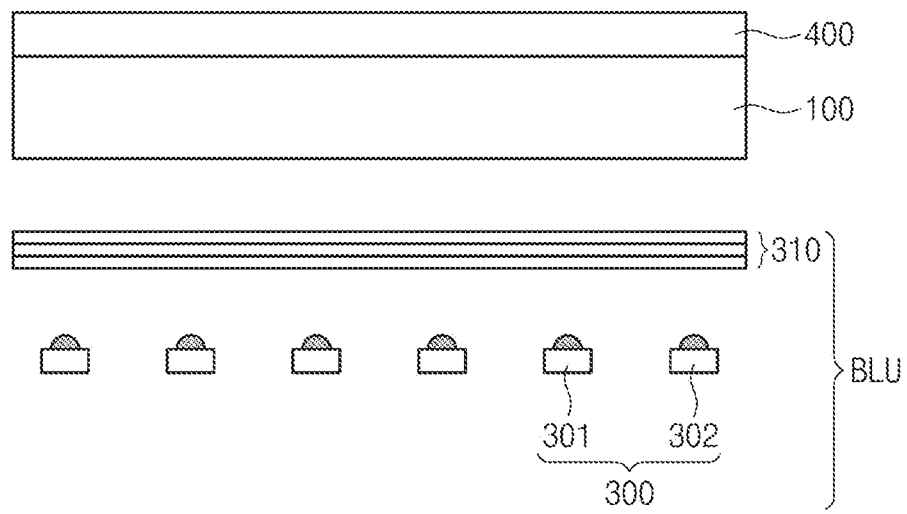
FIG. 16A is a schematic cross-sectional view illustrating the display device according to the exemplary embodiment of the invention.

FIG. 16A is a schematic cross-sectional view illustrating the display device according to the exemplary embodiment of the invention. FIG. 16A may be a schematic cross-sectional view of the display device of FIG. 4.

Referring to FIGS. 4 and 16A, the display device 1000 includes the display panel 100, the wavelength conversion member 400, and a backlight unit BLU. The backlight unit BLU illustrated in FIG. 16A may be referred to as a direct-type backlight unit BLU.

The wavelength conversion member 400 may be disposed on the display panel 100. The wavelength conversion member 400 and the display panel 100 may be integrally provided, and the wavelength conversion member 400 may be included in the display panel 100.

The backlight unit BLU may be disposed under the display panel 100. The backlight unit BLU may include the light source unit 300 and optical sheets 310.

The optical sheets 310 may be disposed under the display panel 100. The optical sheets 310 may be diffusion sheets for diffusing light or light collecting sheets for condensing light. Although the plurality of optical sheets 310 is provided as an example, a single optical sheet may be provided or the optical sheet may be omitted.

The light source unit 300 may be disposed under the optical sheets 310. That is, the light source unit 300 may provide light toward the display panel 100. The light source unit 300 may include the plurality of first light sources 301 and the plurality of second light sources 302.

Figure 16B:
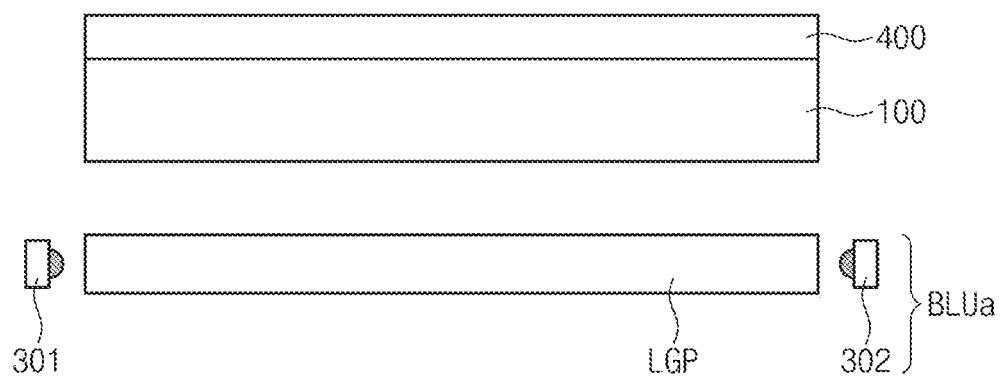
FIG. 16B is a schematic cross-sectional view illustrating the display device according to the exemplary embodiment of the invention.

FIG. 16B is a schematic cross-sectional view illustrating the display device according to the exemplary embodiment of the invention. FIG. 16B may be a schematic cross-sectional view of the display device of FIG. 4.

Referring to FIGS. 4 and 16B, the display device 1000 includes the display panel 100, the wavelength conversion member 400, and a backlight unit BLUa. The backlight unit BLUa illustrated in FIG. 16B may be referred to as an edge-type backlight unit BLUa.

The backlight unit BLUa may include the light source units 301 and 302 and a light guide plate LGP. The light source units 301 and 302 may include the first light source 301 and the second light source 302. Although one first light source 301 and one second light source 302 are illustrated in FIG. 16B, each of the first light source 301 and the second light source 302 may be provided in plurality.

The first light source 301 and the second light source 302 are disposed on one side of the light guide plate LGP. FIG. 16B exemplarily illustrates that the first light source 301 and the second light source 302 face each other with the light guide plate LGP disposed therebetween, but the exemplary embodiments of the invention are not limited thereto. For example, both of the first light source 301 and the second light source 302 may be disposed to face the same one side of the light guide plate LGP.

Figure 16C:
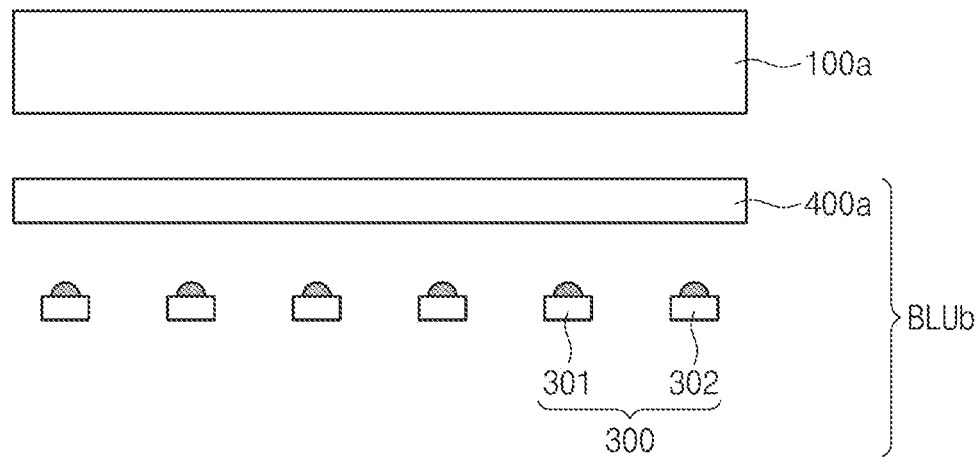
FIG. 16C is a schematic cross-sectional view illustrating the display device according to the exemplary embodiment of the invention.

FIG. 16C is a schematic cross-sectional view illustrating the display device according to the exemplary embodiment of the invention. FIG. 16C may be a schematic cross-sectional view of the display device of FIG. 13.

Referring to FIGS. 13 and 16C, the display device 1000a includes the display panel 100a and a backlight unit BLUb.

The backlight unit BLUb illustrated in FIG. 16C may be referred to as a direct-type backlight unit BLUb. The backlight unit BLUb is disposed under the display panel 100a. The backlight unit BLUb includes the wavelength conversion member 400a and the light source unit 300.

The light source unit 300 may include the plurality of first light sources 301 and the plurality of second light sources 302. The light source unit 300 may be disposed under the wavelength conversion member 400a. That is, the light source unit 300 may provide light toward the display panel 100a.

The backlight unit BLUb may further include an optical sheet. The optical sheet may function to diffuse or condense light. The optical sheet may be provided between the display panel 100a and the wavelength conversion member 400a.

Figure 16D:
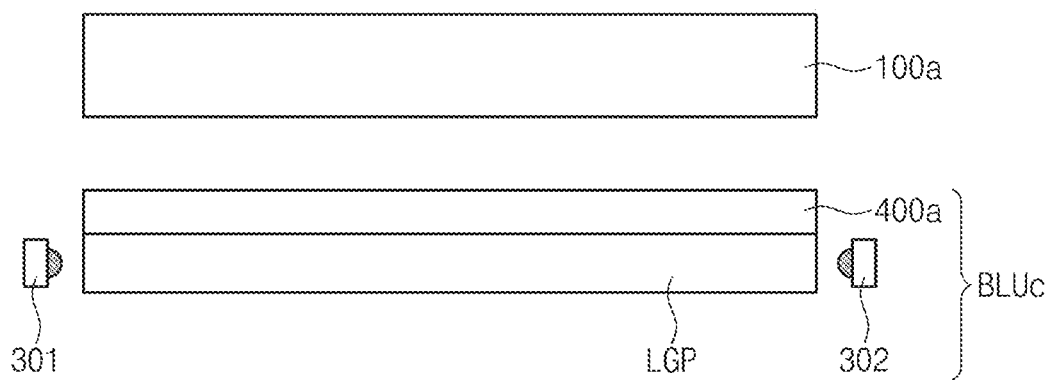
FIG. 16D is a schematic cross-sectional view illustrating the display device according to the exemplary embodiment of the invention.

FIG. 16D is a schematic cross-sectional view illustrating the display device according to the exemplary embodiment of the invention. FIG. 16D may be a schematic cross-sectional view of the display device of FIG. 13.

Referring to FIGS. 13 and 16D, the display device 1000a includes the display panel 100a and a backlight unit BLUc.

The backlight unit BLUc illustrated in FIG. 16D may be referred to as an edge-type backlight unit BLUc. The backlight unit BLUc is disposed under the display panel 100a. The backlight unit BLUc includes the wavelength conversion member 400a, the light guide plate LGP, and the light source units 301 and 302.

The light guide plate LGP may be a glass light guide plate LGP or a plastic light guide plate LGP. However, this is only an example, and the exemplary embodiments of the invention are not limited thereto.

The wavelength conversion member 400a may be disposed on the light guide plate LGP. For example, the wavelength conversion member 400a may be provided by coating the light guide plate LGP with a material including a light-emitting material. However, this is only an example, and the wavelength conversion member 400a may be provided in the form of a film and disposed on the light guide plate LGP.

According to the principles and exemplary embodiments of invention, a light source unit provides first light and second light, which have different peak wavelengths, to a wavelength conversion member. The wavelength conversion member includes a light-emitting material which absorbs at least one of the first light and the second light and converts a wavelength of the absorbed light. One pixel area among a plurality of pixel areas of a display panel outputs the first light. A peak wavelength of the first light may be determined by considering color purity of the first light. The second light may have a shorter wavelength than the first light. Thus, light absorption rate and optical conversion efficiency of the light-emitting material with respect to the light provided from the light source unit may be improved. Accordingly, a display device having improved color reproducibility and luminous efficiency may be provided.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a light source unit having:
      a first light source to emit a first light having a first peak wavelength; and
      a second light source to emit a second light having a second peak wavelength,
   the second peak wavelength being shorter than the first peak wavelength;
   a wavelength conversion member to perform a wavelength conversion on at least one of the first light and the second light by absorbing the at least one of the first light and the second light into a first color light and a second color light, each of the first color light and the second color light having peak wavelengths different from the first peak wavelength and the second peak wavelength; and
   a display panel having a first pixel area to display the first color light, a second pixel area to display the second color light, and a third pixel area to display a third color light,
   wherein the display panel is configured to display an image on a frame-by-frame basis, each frame comprising a first sub-frame and a second sub-frame which are separate time divisions of the frame,
   wherein the first peak wavelength and the second peak wavelength have a value of about 365 nm or more to about 500 nm or less, wherein:
   the first light having the first peak wavelength, the second light having the second peak wavelength, and the third color light are of a substantially same color light,
   during the first sub-frame, the first pixel area and the second pixel area are configured to emit the first color light and the second color light, respectively, by converting the first light generated by the first light source, and the third pixel area is configured to emit the third color light by transmitting the first light generated by the first light source, and
   during the second sub-frame, the first pixel area and the second pixel area are configured to emit the first color light and the second color light, respectively, by converting the first light generated by the first light source and the second light generated by the second light source, and the third pixel area does not emit any light by blocking the first light generated by the first light source and the second light generated by the second light source.

2. The display device of claim 1, wherein the first light, the second light, and the third color light are blue light.

3. The display device of claim 1, wherein the first peak wavelength is in a range of about 450 nm or more to about 500 nm or less, and the second peak wavelength is in a range of about 365 nm or more to less than the first peak wavelength.

4. The display device of claim 1,
   wherein the first light source is configured to emit the first light during the first sub-frame, and the first light source and the second light source are configured to emit the first light and the second light, respectively, during the second sub-frame.

5. The display device of claim 4, wherein the first color light and the second color light have a longer wavelength than the first light,
   wherein the first color light has a longer wavelength than the second color light.

6. The display device of claim 1, wherein the wavelength conversion member comprises a first wavelength conversion portion and a second wavelength conversion portion, wherein the first wavelength conversion portion comprises a first light-emitting material and the second wavelength conversion portion comprises a second light-emitting material, wherein the first wavelength conversion portion is configured to convert at least one of the first light and the second light into the first color light, the second wavelength conversion portion is configured to convert at least one of the first light and the second light into the second color light, and wherein the first pixel area overlaps the first wavelength conversion portion, and the second pixel area overlaps the second wavelength conversion portion.

7. The display device of claim 6, wherein the wavelength conversion member further comprises a light-transmitting portion that transmits the first light, and the third pixel area overlaps the light-transmitting portion.

8. The display device of claim 1, wherein the wavelength conversion member is disposed under the display panel, and the wavelength conversion member is configured to provide the first light, the second light, the first color light, and the second color light to the display panel.

9. A method of time division driving a display device having a first light source configured to emit a first blue light, a second light source configured to emit a second blue light, and a wavelength conversion member comprising a light-emitting material and configured to receive light from the first and the second light sources to generate a red color light and a green color light to display an image on a display panel on a frame-by-frame basis, with each frame having first and second sub frames, the display panel having a first pixel area to display the red color light, a second pixel area to display the green color light, and a third pixel area to display a blue color light, the method comprising:

driving the first light source to generate the first blue light in the first sub frame;

transmitting the first blue light in the first pixel area, the second pixel area, and the third pixel area such that the first pixel area and the second pixel area are configured to emit the red color light and the green color light by converting the first blue light, and the third pixel area is configured to emit the blue color light, respectively, by transmitting the first blue light during the first sub frame;

driving the first light source and the second light source to generate the first blue light and the second blue light in the second sub frame;

transmitting the first blue light and the second blue light to the wavelength conversion member in the first pixel area and the second pixel area such that the first pixel area and the second pixel area are configured to emit the red color light and the green color light, respectively, by converting the first blue light and the second blue light during the second sub frame;

blocking the first blue light and the second blue light in the third pixel area such that the third pixel area does not emit any light during the second sub frame, and increasing a light absorption rate of the light-emitting material by the second blue light.

10. The method of claim 9, wherein the transmitting of the first blue light during the first sub frame comprises transmitting the first blue light through the wavelength conversion member, and the blocking the first blue light and the second blue light in the third pixel area during the second sub frame comprises blocking the second blue light from being transmitted to the wavelength conversion member.

11. The method of claim 10, further comprising:

blocking the first blue light from generating the red color light and the green color light in the wavelength conversion member in another operating mode.

12. The method of claim 9, further comprising:

blocking the first blue light from generating the green color light in the wavelength conversion member in another operating mode.

13. The method of claim 9, wherein the display device further includes a liquid crystal layer configured to adjust transmission amounts of the first blue light provided from the first light source and the second blue light provided from the second light source, and wherein the wavelength conversion member is configured to receive light from the liquid crystal layer.

14. The method of claim 9, wherein each frame further has a third sub frame, and the method further comprising:

driving one of the first and second light source to generate a third light in the third sub frame;

transmitting the third light to the outside of the display device to display the third light on the display panel; and blocking at least one of the first blue light and the second blue light, during the third sub frame, from being transmitted to the outside of the display device.

* * * * *